US00RE48406E

(19) United States
(12) Reissued Patent
Hiura et al.

(10) Patent Number: US RE48,406 E
(45) Date of Reissued Patent: Jan. 26, 2021

(54) VEHICLE DATA COLLECTION SYSTEM, VEHICLE DATA COLLECTION METHOD, VEHICLE-MOUNTED DEVICE, PROGRAM, AND RECORDING MEDIUM

(71) Applicant: MITSUBISHI HEAVY INDUSTRIES MACHINERY SYSTEMS, LTD., Kobe (JP)

(72) Inventors: Ryota Hiura, Tokyo (JP); Yoshihiro Mabuchi, Tokyo (JP); Junichi Hyodo, Tokyo (JP)

(73) Assignee: MITSUBISHI HEAVY INDUSTRIES MACHINERY SYSTEMS, LTD., Hyogo-Ku (JP)

(21) Appl. No.: 16/192,024

(22) Filed: Nov. 15, 2018

Related U.S. Patent Documents

Reissue of:
(64) Patent No.: 9,495,813
Issued: Nov. 15, 2016
Appl. No.: 14/443,873
PCT Filed: Nov. 12, 2013
PCT No.: PCT/JP2013/080521
§ 371 (c)(1),
(2) Date: May 19, 2015
PCT Pub. No.: WO2014/080796
PCT Pub. Date: May 30, 2014

(30) Foreign Application Priority Data

Nov. 20, 2012 (JP) ..... 2012-254100

(51) Int. Cl.
*G07C 5/02* (2006.01)
*G08G 1/01* (2006.01)
(Continued)

(52) U.S. Cl.
CPC ..... *G07C 5/02* (2013.01); *G07B 15/06* (2013.01); *G08G 1/01* (2013.01); *G08G 1/017* (2013.01); *G08G 1/065* (2013.01)

(58) Field of Classification Search
CPC ..... G07C 5/02; G08G 1/0967
See application file for complete search history.

(56) References Cited

U.S. PATENT DOCUMENTS 6,109,525 A * 8/2000 Blomqvist ..... G01C 11/02 235/380
6,232,744 B1 * 5/2001 Kawai ..... G01R 31/396 320/132
(Continued)

FOREIGN PATENT DOCUMENTS

CN 1495651 A 5/2004
CN 101286266 A 10/2008
(Continued)

OTHER PUBLICATIONS

PCT/ISA/210, "International Search Report for International Application No. PCT/JP2013/080521," dated Feb. 4, 2014.
(Continued)

*Primary Examiner* — Catherine M Tarae
(74) *Attorney, Agent, or Firm* — Manabu Kanesaka; Benjamin Hauptman; Kenneth Berner

(57) ABSTRACT

A vehicle data collection system includes a vehicle-mounted device installed in a vehicle and configured to transmit data related to the vehicle, and a vehicle data collection device configured to collect the data related to the vehicle, wherein the vehicle-mounted device includes a vehicle data transmission unit configured to transmit first vehicle data, which includes information in which an individual related to the vehicle is to be identified, and second vehicle data, which includes information in which the individual related to the vehicle is not to be identified, to the vehicle data collection device in different sessions, the first vehicle data and the second vehicle data are data related to the vehicle.

20 Claims, 23 Drawing Sheets

(51) Int. Cl.

| | |
|---|---|
| ***G07B 15/06*** | (2011.01) |
| ***G08G 1/017*** | (2006.01) |
| ***G08G 1/065*** | (2006.01) |

(56) References Cited

U.S. PATENT DOCUMENTS

| | | | | |
|---|---|---|---|---|
| 6,724,172 | B2 * | 4/2004 | Koo | H02J 7/0022 320/128 |
| 6,794,849 | B2 * | 9/2004 | Mori | H02J 7/0022 320/107 |
| 7,027,808 | B2 * | 4/2006 | Wesby | G06Q 40/06 455/419 |
| 7,301,464 | B2 | 11/2007 | Coulter | |
| 8,509,976 | B2 * | 8/2013 | Kempton | G06Q 30/0601 701/22 |
| 8,565,950 | B2 * | 10/2013 | Ishibashi | G07F 15/005 701/22 |
| 8,604,750 | B2 * | 12/2013 | Turner | B60L 53/305 320/109 |
| 9,035,791 | B2 * | 5/2015 | Matsumoto | G06Q 50/06 340/870.02 |
| 9,037,507 | B2 * | 5/2015 | Tate, Jr. | B60L 11/1824 705/34 |
| 9,098,076 | B2 * | 8/2015 | Kubota | G05B 15/02 |
| 9,348,381 | B2 * | 5/2016 | Khoo | B60L 53/64 |
| 2005/0168351 | A1 * | 8/2005 | Saze | G01C 21/26 340/928 |
| 2006/0064345 | A1 * | 3/2006 | Biet | G07B 15/063 705/13 |
| 2007/0225912 | A1 * | 9/2007 | Grush | G01C 21/20 701/469 |
| 2009/0012851 | A1 * | 1/2009 | Marc | G07B 15/063 705/13 |
| 2009/0018902 | A1 * | 1/2009 | Miller | G06Q 50/30 705/13 |
| 2009/0160675 | A1 * | 6/2009 | Piccinini | G08G 1/127 340/905 |
| 2011/0025267 | A1 * | 2/2011 | Kamen | B60L 8/003 320/109 |

FOREIGN PATENT DOCUMENTS

| | | | |
|---|---|---|---|
| JP | H11-250383 | A | 9/1999 |
| JP | 2004-030684 | A | 1/2004 |
| JP | 2004-523020 | A | 7/2004 |
| JP | 2004-236063 | A | 8/2004 |
| JP | 2010-250416 | A | 11/2010 |
| WO | 2008/050400 | A1 | 5/2008 |
| WO | 2008/053566 | A1 | 5/2008 |
| WO | 2011/013113 | A1 | 2/2011 |

OTHER PUBLICATIONS

PCT/ISA/237, "Written Opinion of the International Opinion of the International Searching Authority for International Application No. PCT/JP2013/080521," dated Feb. 4, 2014.

China Patent Office, "Office Action for Chinese Patent Application No. 201380054992.X," dated Feb. 1, 2016.

Japan Patent Office, "Office Action for Japanese Patent Application No. 2012-254100," dated Sep. 6, 2016.

U.S.P.T.O., "Office Action for U.S. Appl. No. 14/443,873," dated Feb. 23, 2016.

Hiroaki, WO 2008/053566 Machine translation, May 2008.*

* cited by examiner

134

| ON-BOARD UNIT ID | ACCOUNTING TIME (YEAR/MONTH/DAY/HOUR:MINUTE:SECOND) | ACCOUNTING PLACE | ACCOUNTING PRICE (YEN) |
|---|---|---|---|
| OBU0048 | 2011/07/15/16:08:19 | SHIODOME | 600 |
| OBU1991 | 2011/07/15/16:08:20 | DAIBA | 600 |
| OBU2007 | 2011/07/15/16:08:31 | SHINTOSHIN | 900 |
| ⋮ | ⋮ | ⋮ | ⋮ |

135

| RANDOM ID | POSITION (LONGITUDE, LATITUDE) | POSITIONING TIME (YEAR/MONTH/DAY/HOUR:MINUTE:SECOND) |
|---|---|---|
| 042YuRzKwv1C | (E1、N1) | 2011/07/15/15:19:00 |
| 042YuRzKwv1C | (E2、N2) | 2011/07/15/15:19:30 |
| 042YuRzKwv1C | (E3、N3) | 2011/07/15/15:20:00 |
| ⋮ | ⋮ | ⋮ |

135

| RANDOM ID | SOC(%) | TIME (YEAR/MONTH/DAY/HOUR:MINUTE:SECOND) |
|---|---|---|
| 042YuRzKwv1C | 100 | 2011/07/15/15:19:00 |
| 042YuRzKwv1C | 99 | 2011/07/15/15:22:00 |
| 042YuRzKwv1C | 99 | 2011/07/15/15:25:00 |
| ⋮ | ⋮ | ⋮ |

FIG. 31

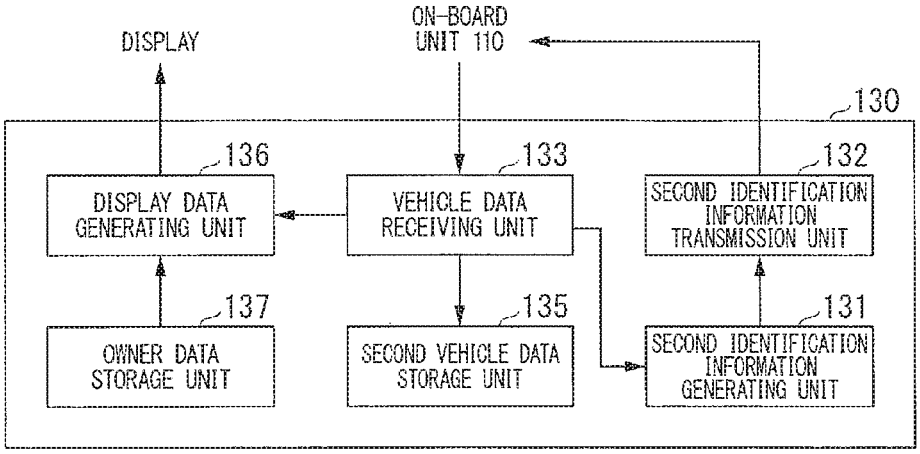

FIG. 32

137

| ON-BOARD UNIT ID | NAME | AGE (YEARS) | GENDER | BODY TYPE | COLOR |
|---|---|---|---|---|---|
| OBU0001 | ○○○○ | 20 | FEMALE | 2-BOX | WHITE |
| OBU0002 | ○○○○ | 35 | MALE | STATION WAGON | SILVER |
| OBU0003 | ○○○○ | 31 | FEMALE | LIGHT CAR | BLACK |
| ⋮ | ⋮ | ⋮ | ⋮ | ⋮ | ⋮ |

FIG. 33

D

ACCIDENT OCCURRED.

CURRENT LOCATION OF VEHICLE INVOLVED IN THE ACCIDENT
STREET IN FRONT OF ○○ HOSPITAL, JINGUUMAE, SHIBUYA-KU, TOKYO

VEHICLE INVOLVED IN THE ACCIDENT
BODY TYPE: 2-BOX
COLOR: SILVER

OWNER
NAME: ○○○○
AGE: 20(YEARS)
GENDER: FEMALE

VEHICLE DATA COLLECTION SYSTEM, VEHICLE DATA COLLECTION METHOD, VEHICLE-MOUNTED DEVICE, PROGRAM, AND RECORDING MEDIUM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to a vehicle data collection system, a vehicle data collection method, a vehicle-mounted device, a program, and a recording medium.

*This is a reissue application of U.S. Pat. No. 9,495,813, which is a 371 of PCT/JP2013/080521 filed on Nov. 12, 2013, and* Priority is claimed on Japanese Patent Application No. 2012-254100, filed Nov. 20, 2012, the content of which is incorporated herein by reference.

BACKGROUND ART

In a vehicle during travel, there are various types of information, for example, information displayed on instruments such as a traveling speed, engine revolution speed, a residual quantity of fuel, and so on, information such as a position of a vehicle, or the like. The concept of a probe car is to collect the information, effectively use the information, and so on.

For example, when the speed and the position of the vehicle are collected, the traffic situation of a predetermined section can be accurately recognized. A large number of sensors configured to measure the number of passing vehicles and their speeds are installed on some roads at short intervals of several hundred meters, and even at present, accurate congestion information is provided. On the other hand, since a probe car uses the vehicle itself as a sensor, information can be collected even on a road on which the sensor is not installed.

In addition, as another method of using a probe car, when information referred to as a brake pedal condition information is collected and a place where a large number of drivers brake suddenly is investigated, a place where a certain hazard easily occurs can be analyzed, and occurrence of an accident can be prevented by taking measures in advance. Further, as another method of using a probe car, a method of collecting ON-OFF information on a switch of a wiper and recognizing a local weather situation is considered.

While there are many other methods of using a probe car, the methods includes problems, such as privacy problems. The probe car may invade the privacy of the driver of a vehicle. This is because who is in the vehicle, when the vehicle moves, and where the vehicle may be determined. Here, the probe car is preferably required to securely protect individual privacy while collecting necessary information, and feed back advantageous information to a user.

As technologies related to such a background, various technologies are known (for example, see Patent Literature 1).

For example, Patent Literature 1 discloses an information processing device capable of acquiring traffic information using a mobile communication terminal. More specifically, the device generates identification information that can identify a handheld communication terminal carried on one or more moving bodies only to a period required for traffic information collection. Then, the device collects an arrival time when a handheld communication terminal arrives at two or more predetermined places or an arrival position of the handheld communication terminal at two or more predetermined times based on identification information. Then, the device stores the collected arrival time or arrival position to correspond to the generated identification information. Then, the device detects a moving state of the moving body based on the arrival time or the arrival position stored to correspond to the identification information. In addition, the device instructs the handheld communication terminal to remove the identification information stored in the handheld communication terminal at predetermined timing. In this way, for example, a user of the handheld communication terminal can provide place information without fear of invasion of privacy.

CITATION LIST

Patent Literature

[Patent Literature 1] Japanese (Unexamined Patent Application, First Publication No. 2004-030684

SUMMARY OF INVENTION

Technical Problem

It is desired for a probe car to collect information in which an individual related to a vehicle is to be identified and information in which the individual related to the vehicle is not to be identified without invasion of a user's privacy. Here, the information in which the individual is to be identified is, for example, information such as accounting information or the like.

Solution to Problem

In order to solve the problems, according to a first aspect of the present invention, a vehicle data collection system for collecting data related to a vehicle, the system includes: a vehicle-mounted device installed in the vehicle and configured to transmit data related to the vehicle; and a vehicle data collection device configured to collect the data related to the plurality of vehicles, wherein the vehicle-mounted device includes a vehicle data transmission unit configured to transmit first vehicle data, which includes information in which an individual related to the vehicle is to be identified and second vehicle data, which includes information in which the individual related to the vehicle is not to be identified, to the vehicle data collection device in different sessions, the first vehicle data and the second vehicle data are data related to the vehicle.

The vehicle data transmission unit may transmit data further including first identification information that is capable of identifying the individual related to the vehicle only when the first vehicle data is transmitted.

The vehicle-mounted device may further includes a temporally changed information acquisition unit configured to acquire information related to a time-varied event of the vehicle, and the vehicle data transmission unit may transmit the second vehicle data including information acquired by the temporally changed information acquisition unit as the information in which the individual related to the vehicle is not to be identified whenever the temporally changed information acquisition unit acquires information.

The vehicle data transmission unit may transmit data further including second identification information that is not capable of identifying the individual related to the vehicle and is common to a plurality of sessions when the second vehicle data including the information acquired by the temporally changed information acquisition unit is transmitted in the plurality of sessions.

After a motor of the vehicle is started, when the second vehicle data is initially transmitted, the vehicle data transmission unit may transmit data including a new second identification information.

The vehicle data transmission unit may transmit the first vehicle data and the second vehicle data to different vehicle data collection devices respectively.

According to a second aspect of the present invention, a vehicle data collection method of collecting data related to a vehicle, the vehicle data collection method includes a vehicle data transmission step in which a vehicle-mounted device installed in the vehicle and configured to transmit the data related to the vehicle transmits first vehicle data, which includes information in which an individual related to the vehicle is to be identified and second vehicle data, which includes information in which the individual related to the vehicle is not to be identified, to a vehicle data collection device configured to collect data related to the plurality of vehicles in different sessions, the first vehicle data and the second vehicle data are data related to the vehicle.

According to a third aspect of the present invention, a vehicle-mounted device installed in a vehicle and configured to transmit data related to the vehicle, the vehicle-mounted device includes a vehicle data transmission unit configured to transmit first vehicle data, which includes information in which an individual related to the vehicle is to be identified and second vehicle data, which includes information in which the individual related to the vehicle is not to be identified, to a vehicle data collection device configured to collect data related to a plurality of vehicles in different sessions, the first vehicle data and the second vehicle data are data related to the vehicle.

According to a fourth aspect of the present invention, a program configured to cause a computer to function as a vehicle-mounted device installed in a vehicle and configured to transmit data related to the vehicle, the program is configured to function as a vehicle data transmission unit configured to transmit first vehicle data, which includes information in which an individual related to the vehicle is to be identified, and second vehicle data, which includes information in which the individual related to the vehicle is not to be identified, to a vehicle data collection device configured to collect data related to a plurality of vehicles in different sessions, the first vehicle data and the second vehicle data are data related to the vehicle.

According to a fifth aspect of the present invention, a recording medium on which a program configured to cause a computer to function as a vehicle-mounted device installed in a vehicle and configured to transmit data related to the vehicle is recorded, the recording medium records the program configured to function as a vehicle data transmission unit configured to transmit first vehicle data, which includes information in which an individual related to the vehicle is to be identified and second vehicle data, which includes information in which the individual related to the vehicle is not to be identified, to a vehicle data collection device configured to collect data related to a plurality of vehicles in different sessions, the first vehicle data and the second vehicle data are data related to the vehicle.

Furthermore, the summary of the present invention does not enumerate all of features necessary for the present invention. In addition, sub-combinations of these feature groups also fall into the scope of the present invention.

Advantageous Effects of Invention

As will be apparent from the above-mentioned description, according to the present invention, information in which an individual related to the vehicle is to be identified and information in which the individual related to the vehicle is not to be identified can be collected without invasion of a user's privacy.

BRIEF DESCRIPTION OF DRAWINGS

FIG. 2 is a view showing an example of a block configuration of an on-board unit 110a.

FIG. 31 is a view showing an example of a block configuration of the vehicle data collection server 130 according to the sixth embodiment.

FIG. 32 is a view showing a table indicating an example of information stored in an owner data storage unit 137 according to the sixth embodiment.

FIG. 33 is a view showing an example of a display screen D displayed on a display.

DESCRIPTION OF EMBODIMENTS

Hereinafter, while the present invention will be described with reference to embodiments of the present invention, the following embodiments of the present invention are not intended to limit the scope of the accompanying claims, and not limited as long as all of the combinations of features described in the embodiments are necessary for the solution according to the present invention.

Figure 1:
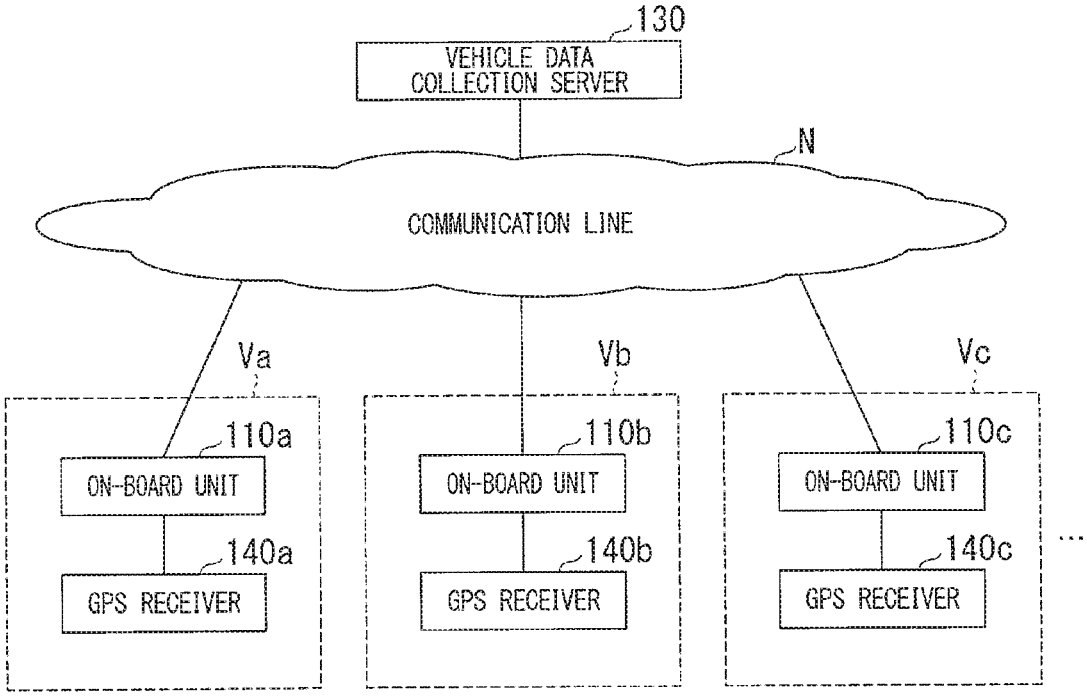
FIG. 1 is a view showing an example of a usage environment of a vehicle data collection system according to a first embodiment.

FIG. 1 shows an example of a usage environment of a vehicle data collection system according to a first embodiment. The vehicle data collection system is a system for collecting data related to a plurality of vehicles Va, Vb, Vc, . . . (hereinafter, generally referred to as a vehicle V). Furthermore, the vehicle data collection system may be a system for collecting data related to one vehicle, instead of to a plurality of vehicles.

The vehicle data collection system includes a plurality of on-board units 110a, 100b, 100c, . . . (hereinafter, generally referred to as an on-board unit 110), a vehicle data collection server 130, and a plurality of GPS receivers 140a, 140b, 140c, . . . (hereinafter, generally referred to as a GPS receiver 140). Furthermore, the on-board unit 110 may be an example of "a vehicle-mounted device" of the present invention. In addition, the vehicle data collection server 130 may be an example of "a vehicle data collection device" of the present invention.

The GPS receiver 140 is a device for positioning a position at which the GPS reciver 140 is located on the earth using GPS satellites. More specifically, the GPS receivers 140 are installed in each of the vehicles V. Then, the GPS receiver 140 is electrically connected to the on-board unit 110 installed in the vehicle V. Then, the GPS receiver 140 detects a transmission delay time from time information transmitted from the GPS satellite, and repeatedly calculates latitude and longitude from simultaneous equations using the data of three or four satellites. Then, the GPS receiver 140 outputs data representing the latitude and the longitude to the on-board unit 110 whenever the latitude and the longitude are calculated.

The on-board unit 110 is a device configured to transmit data related to the vehicle to the vehicle data collection server 130. More specifically, the on-board units 110 are installed in each of the vehicles V. Then, the on-board unit 110 is electrically connected to the GPS receiver 140 installed in the vehicle V. In addition, the on-board unit 110 is connected for communication with the vehicle data collection server 130 via a communication line N. Then, whenever an input of the data output from the GPS receiver 140 is received, the on-board unit 110 transmits position data including position information such as latitude, longitude, and so on, indicated by the data output from the GPS receiver 140 to the vehicle data collection server 130. In addition, an integrated circuit (IC) card on which contract information or the like is recorded is inserted into a card slot of the on-board unit 110. Then, the on-board unit 110 records accounting information such as a toll fee or the like of a toll road on the IC card, and transmits accounting data including the accounting information such as the toll fee or the like to the vehicle data collection server 130 when the vehicle V uses the toll road. Here, the on-board unit 110 transmits the accounting data and the position data to the vehicle data collection server 130 in different sessions. Furthermore, the position information may be an example of "information in which an individual related to the vehicle is not to be identified" and "information related to a time-varied event of the vehicle" of the present invention. In addition, the position data may be an example of "second vehicle data" of the present invention. In addition, the accounting information may be an example of "information in which the individual related to the vehicle is to be identified" of the present invention. In addition, the accounting data may be an example of "first vehicle data" of the present invention. In addition, the communication line N includes a computer network such as the Internet or the like, a core network of a telecommunications carrier, and various local networks.

Here, "the information in which the individual related to the vehicle is not to be identified" is information managed without being connected to an individual owner of the vehicle V, and in addition to the position information, for example, information on a travel distance, information on a travel time, or the like, is considered. Here, "the information in which the individual related to the vehicle is to be identified" is information managed to be connected to an individual owner of the vehicle V, and in addition to the accounting information, for example, information related to request of a roadside assistance or the like is considered. These may be set according to use circumstances but are not classified in a uniform manner. For example, the information on the travel distance may be classified as "the information in which the individual related to the vehicle is to be identified."

The vehicle data collection server 130 is a computer configured to collect data related to the plurality of vehicles V. More specifically, the vehicle data collection server 130 is connected for communication with the on-board unit 110 via the communication line N. Then, the vehicle data collection server 130 receives and manages the accounting data or the position data transmitted from the on-board unit 110.

Figure 2:
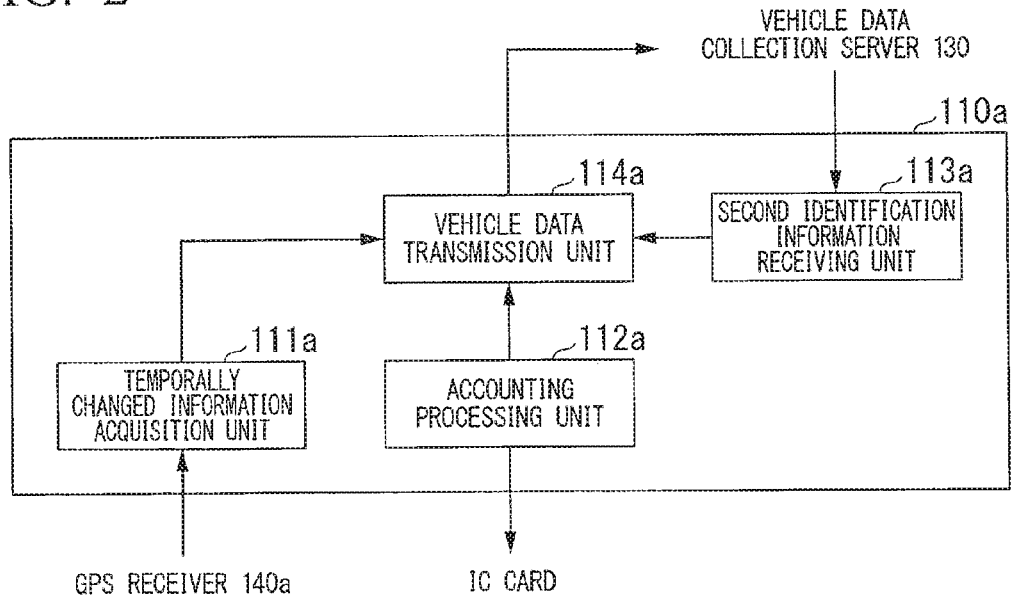

FIG. 2 shows an example of a block configuration of the on-board unit 110a. The on-board unit 110a has a temporally changed information acquisition unit 111a, an accounting processing unit 112a, a second identification information receiving unit 113a, and a vehicle data transmission unit 114a.

Furthermore, in addition to the on-board unit 110a, the on-board units 110b, 110c, . . . also have the same components as the components included in the on-board unit 110a. In the following description, when the component included in the on-board unit 110 is any one of the components of the on-board unit 110 to be distinguished, the same subscript (a, b, c, . . .) as the on-board unit 110 having each component is tagged to each component to distinguish the component. For example, the temporally changed information acquisition unit 111a, a temporally changed information acquisition unit 111b, and a temporally changed information acquisition unit 111c represent components of the on-board unit 110a, the on-board unit 110b, and the on-board unit 110c, respectively. In addition, in the following description, a function and an operation of the component to which the subscript is not tagged represent functions and operations of all of the components to which the same reference numeral is designated. For example, a function and an operation described with reference to a temporally changed information acquisition unit 111 represent functions and operations of the temporally changed information acquisition unit 111a, the temporally changed information acquisition unit 111b, and the temporally changed information acquisition unit 111c, . . . . In the following description, the function and operation of each of the components will be described in detail.

The temporally changed information acquisition unit 111 acquires position information.

An accounting processing unit 112 performs accounting processing of a toll fee of a toll road when the vehicle V uses the toll road.

A second identification information receiving unit 113 receives a random ID (identifier) transmitted from the vehicle data collection server 130. Here, the random ID is a randomly generated temporary ID, and thus, cannot identify the owner of the vehicle V (is not connected to the individual owner). The random ID is imparted as a common ID used in a plurlarity of sessions so that the transmission data in the plurality of sessions are associated with each other as the transmission data from the same on-board unit by the random ID. In addition, the random ID is maintained as the same ID while an engine of the vehicle is in operation (between ON-OFF). Furthermore, the random ID may be an example of "second identification information" of the present invention. In addition, the owner of the vehicle V may be an example of "individual related to the vehicle" of the present invention.

A vehicle data transmission unit 114 transmits the accounting data and the position data to the vehicle data collection server 130 in different sessions. More specifically, the vehicle data transmission unit 114 transmits data further including an on-board unit ID only when the accounting data is transmitted. Here, the on-board unit ID is an ID written on the on-board unit 110 upon setup of the on-board unit 110, and thus, can identify the on-board unit 110 and the owner of the vehicle V at which the on-board unit 110 is installed. In addition, the vehicle data transmission unit 114 transmits the position data including the position information acquired by the temporally changed information acquisition unit 111 whenever the temporally changed information acquisition unit 111 acquires the position information. In addition, the vehicle data transmission unit 114 transmits the position data further including the random ID common to the plurality of sessions when the position data including the position information acquired by the temporally changed information acquisition unit 111 is transmitted in the plurality of sessions. In addition, the vehicle data transmission unit 114 transmits the position data including a new random ID when the position data is initially transmitted after the motor of the vehicle V starts. Furthermore, the on-board unit ID may be an example of "first identification information" of the present invention.

Figures 3, 4, 5:
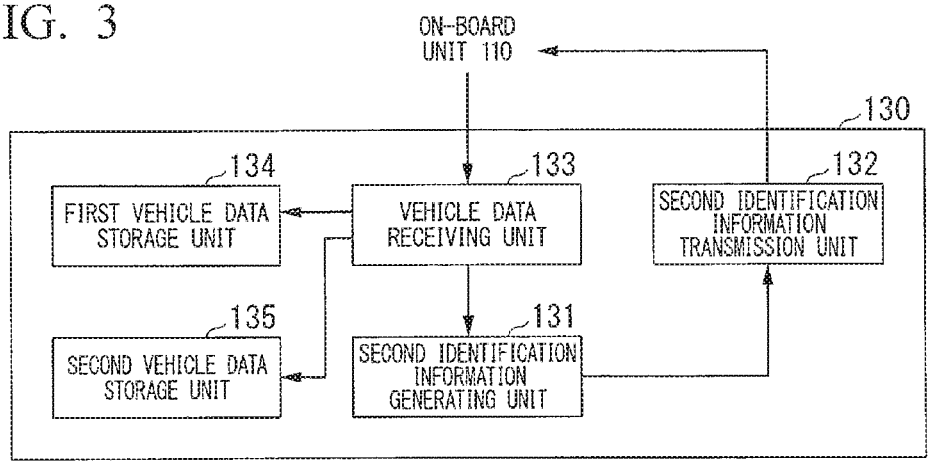
FIG. 3 is a view showing an example of a block configuration of a vehicle data collection server 130.
FIG. 4 is a view showing a table indicating an example of information stored in a first vehicle data storage unit 134.
FIG. 5 is a view showing a table indicating an example of information stored in a second vehicle data storage unit 135.

FIG. 3 shows an example of a block configuration of the vehicle data collection server 130. The vehicle data collection server 130 has a second identification information generating unit 131, a second identification information transmission unit 132, a vehicle data receiving unit 133, a first vehicle data storage unit 134, and a second vehicle data storage unit 135. In the following description, the function and the operation of each of the components will be described in detail.

The second identification information generating unit 131 generates the random ID.

The second identification information transmission unit 132 transmits the random ID to the on-board unit 110.

The vehicle data receiving unit 133 receives the accounting data transmitted from the on-board unit 110. In addition, the vehicle data receiving unit 133 receives the position data transmitted from the on-board unit 110.

FIG. 4 shows a table indicating an example of information stored in the first vehicle data storage unit 134. The information on the on-board unit ID, the accounting time (year/month/day/hour:minute:second), the accounting place, and the accounting price (Yen) are correspondingly stored in the first vehicle data storage unit 134.

The information on the accounting time (year/month/day/hour:minute:second) is information indicating the time when the on-board unit 110 identified by the on-board unit ID performs the accounting processing. The information on the accounting place is information indicating the place at which the on-board unit 110 identified by the on-board unit ID performs the accounting processing. The information on the accounting price (Yen) is information indicating the accounting price in which the on-board unit 110 identified by the on-board unit ID performs the accounting processing.

FIG. 5 shows a table indicating an example of information stored in the second vehicle data storage unit 135. The information on the random ID, the position (longitude, latitude), and the positioning time (year/month/day/hour:

minute:second) are correspondingly stored in the second vehicle data storage unit 135.

The information on the position (longitude, latitude) is information indicating a position on the earth at which the vehicle V in which the on-board unit 110 having the random ID is installed is located. The information on the positioning time (year/month/day/hour:minute:second) is information indicating the time when the position indicated by the information on the position (longitude, latitude) is positioned.

Figure 6:
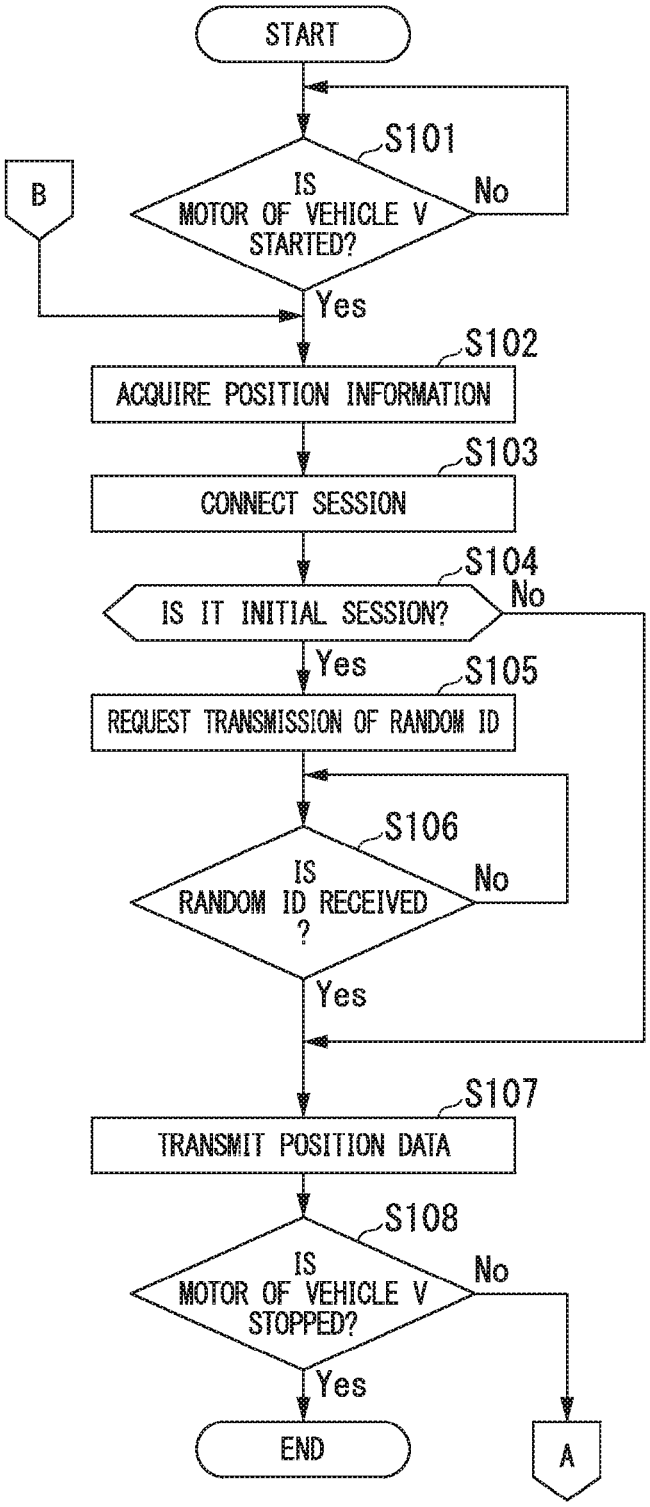
FIG. 6 is a view showing an example of an operation flow of an on-board unit 110.
Figure 7:
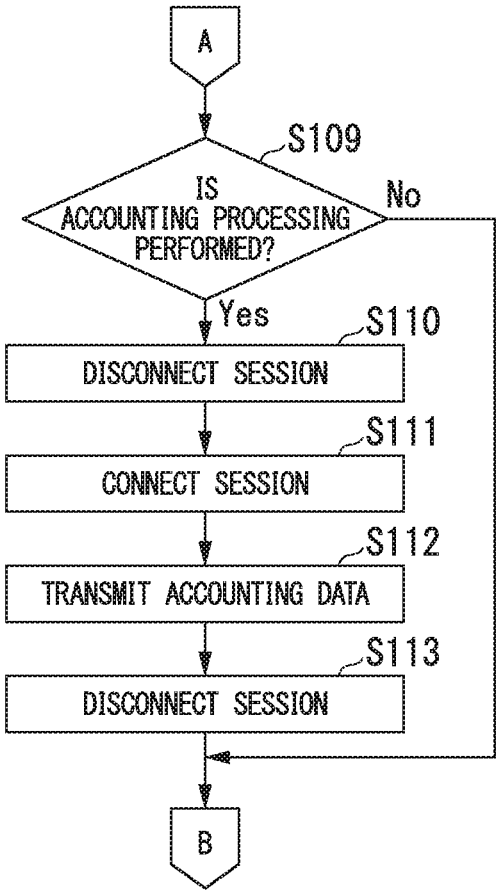
FIG. 7 is a view showing an example of the operation flow of the on-board unit 110.
Figure 8:
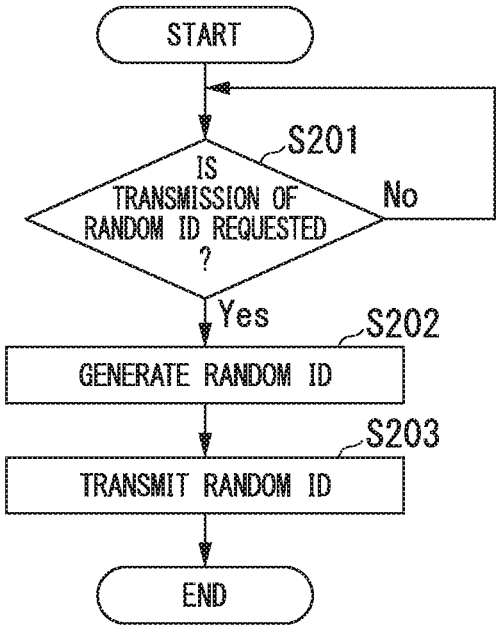
FIG. 8 is a view showing an example of an operation flow of the vehicle data collection server 130.
Figure 9:
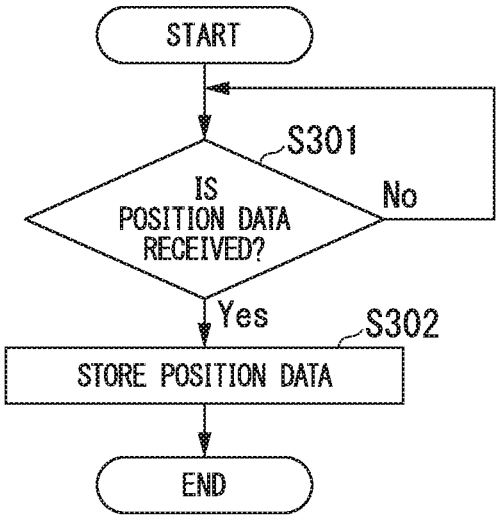
FIG. 9 is a view showing an example of the operation flow of the vehicle data collection server 130.
Figure 10:
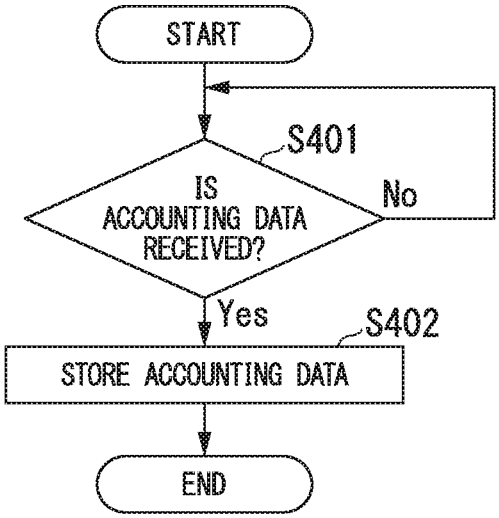
FIG. 10 is a view showing an example of the operation flow of the vehicle data collection server 130.

FIGS. 6 and 7 show an example of an operation flow of the on-board unit 110. FIGS. 8 to 10 show an example of an operation flow of the vehicle data collection server 130. In the description of the operation flows, a process when the vehicle V uses the toll road during the period from the motor of the vehicle V is started until the motor is stopped will be described in detail. Furthermore, the description of the operation flows will be described with reference to FIGS. 1 to 5.

The GPS receiver 140 starts the positioning process when the motor of the vehicle V is started (S101: Yes). For example, the GPS receiver 140 repeatedly performs the positioning processing. Then, the GPS receiver 140 outputs data indicating the position information configured of the latitude, the longitude, and the positioning time, which are positioning process results, to the on-board unit 110 whenever the positioning process is performed.

The temporally changed information acquisition unit 111 of the on-board unit 110 sends the data to the vehicle data transmission unit 114 when the data output from the GPS receiver 140 is acquired (S102).

The vehicle data transmission unit 114 of the on-board unit 110 connects the session with the vehicle data collection server 130 when the data sent from the temporally changed information acquisition unit 111 is received (S103). Here, when the session is initially connected to the vehicle data collection server 130 after the motor of the vehicle V is started (S104: Yes), the vehicle data transmission unit 114 requests the vehicle data collection server 130 to perform transmission of the random ID (S105).

When the transmission request of the random ID from the on-board unit 110 is received (S201: Yes), the vehicle data receiving unit 133 of the vehicle data collection server 130 sends the data indicating this request to the second identification information generating unit 131.

The second identification information generating unit 131 of the vehicle data collection server 130 generates the random ID when the data sent from the vehicle data receiving unit 133 is received (S202). Then, the second identification information generating unit 131 sends the ID data indicating the generated random ID to the second identification information transmission unit 132.

The second identification information transmission unit 132 of the vehicle data collection server 130 transmits the ID data to the on-board unit 110 from which the transmission of the random ID is requested when the ID data sent from the second identification information generating unit 131 is received (S203).

The second identification information receiving unit 113 of the on-board unit 110 sends the ID data to the vehicle data transmission unit 114 when the ID data transmitted from the vehicle data collection server 130 is received (S106: Yes).

The vehicle data transmission unit 114 of the on-board unit 110 transmits the position data including the random ID indicated by the ID data and the position information indicated by the data received from the temporally changed information acquisition unit 111 to the vehicle data collection server 130 when the ID data sent from the second identification information receiving unit 113 is received (S107).

When the position data transmitted from the on-board unit 110 is received (S301: Yes), the vehicle data receiving unit 133 of the vehicle data collection server 130 correspondingly stores each of information included in the data in the second vehicle data storage unit 135 (S302). In this way, the information shown in FIG. 5 is stored in the second vehicle data storage unit 135 of the vehicle data collection server 130.

Here, when the vehicle V uses the toll road, the accounting processing unit 112 of the on-board unit 110 performs the accounting processing of the toll fee of the toll road (S109: Yes). For example, the accounting processing unit 112 performs the accounting processing when the accounting information is received from a roadside wireless device installed in a tollgate of the toll road. In addition, for example, the accounting processing unit 112 performs the accounting processing when use of the toll road is detected, based on the position information in which the positioning is performed by the GPS receiver 140. In either case, the accounting processing unit 112 records the accounting information such as the toll fee of the toll road or the like on the IC card, and sends the data indicating the accounting information such as the toll fee or the like to the vehicle data transmission unit 114.

When the data sent from the accounting processing unit 112 is received, the vehicle data transmission unit 114 of the on-board unit 110 disconnects the session with the vehicle data collection server 130 (S110), and reconnects the session (S111). Then, the vehicle data transmission unit 114 transmits the accounting information such as the toll fee or the like indicated by the data received from the accounting processing unit 112 and the accounting data including the on-board unit ID to the vehicle data collection server 130 (S112).

When the accounting data transmitted from the on-board unit 110 is received (S401: Yes), the vehicle data collection server 130 correspondingly stores each of information included in the accounting data in the first vehicle data storage unit 134 (S402). In this way, the information shown in FIG. 4 is stored in the first vehicle data storage unit 134 of the vehicle data collection server 130.

Meanwhile, after transmission of the accounting data, the vehicle data transmission unit 114 of the on-board unit 110 disconnects the session with the vehicle data collection server 130 (S113). Then, the on-board unit 110 performs the processing from step S102 again.

As described above, the GPS receiver 140 repeatedly performs the positioning processing, and outputs the data indicating the positioning result. Until the motor of the vehicle V is stopped (S108: No), when the accounting processing is not performed (S109: No), the on-board unit 110 repeats the processing of steps S102 to S107. When connection of the session with the vehicle data collection server 130 is not the first after the motor of the vehicle V is started (S104: No), the vehicle data transmission unit 114 transmits the position data including the random ID indicated by the ID data initially received from the second identification information receiving unit 113 after the motor of the vehicle V is started and the position information indicated by the data received from the temporally changed information acquisition unit 111 to the vehicle data collection server 130 (S107). In this way, the position information on the vehicle V during the period from the motor of the vehicle V is started until the motor is stopped is successively stored in the second vehicle data storage unit 135 of the vehicle data collection server 130.

In addition, as described above, in the first embodiment, since the session is disconnected before and after the accounting data is transmitted from the on-board unit 110 to the vehicle data collection server 130, in the vehicle data collection server 130, the on-board unit 110 from which the position data is transmitted and the on-board unit 110 from which the accounting data is transmitted cannot be associated with each other. In other words, the vehicle data collection server 130 cannot identify the owner of the on-board unit 110 from which the position data is transmitted.

In this way, an operator of the vehicle data collection system can identify the owner of the vehicle V and recognize a use situation of the toll road of the vehicle V by referring to the stored information in the first vehicle data storage unit 134 corresponding to the on-board unit ID.

In addition, the operator of the vehicle data collection system can recognize the temporally changed position of the vehicle V without identifying the owner of the vehicle V by referring to the information stored in the second vehicle data storage unit 135 corresponding to the random ID which is common to the plurality of sessions.

Figure 11:
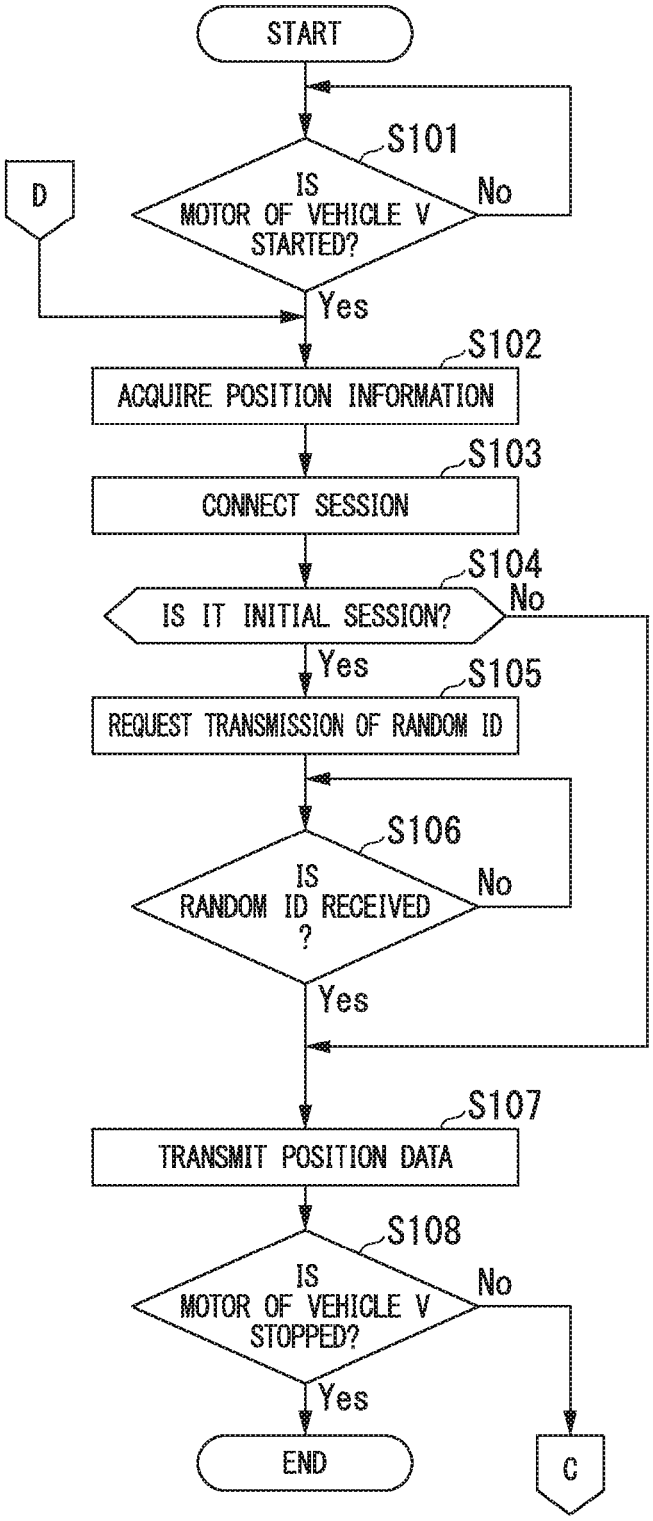
FIG. 11 is a view showing an example of an operation flow of an on-board unit 110 according to a second embodiment.
Figure 12:
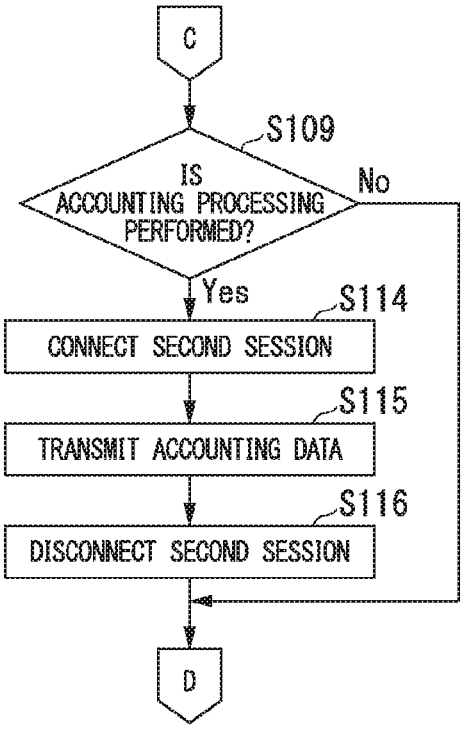
FIG. 12 is a view showing an example of the operation flow of the on-board unit 110 according to the second embodiment.

FIGS. 11 and 12 show an example of an operation flow of the on-board unit 110 according to the second embodiment. In the description of the operation flow, different points from the operation of the on-board unit 110 according to the first embodiment will be described in detail. Furthermore, in the description of the operation flow, FIGS. 1 to 10 will be referenced together. In addition, in processing steps of the operation flow of the on-board unit 110 according to the second embodiment, the processing step having the same name to which the same reference numeral is attached as the processing step of the operation flow of the on-board unit 110 according to the first embodiment represents the same processing as the processing of the operation flow of the on-board unit 110 according to the first embodiment.

When the data sent from the accounting processing unit 112 is received, the vehicle data transmission unit 114 of the on-board unit 110 according to the second embodiment connects a new second session with the vehicle data collection server 130 (S114). Then, the vehicle data transmission unit 114 transmits the accounting information such as a toll fee or the like indicated by the data received from the accounting processing unit 112 and the accounting data including the on-board unit ID to the vehicle data collection server 130 in the second session (S115). The vehicle data transmission unit 114 disconnects the second session with the vehicle data collection server 130 after transmission of the accounting data (S116). Then, the on-board unit 110 performs the processing from step S102 again.

In this way, in the second embodiment, since the second session different from the session for transmitting the position data is used when the accounting data is transmitted from the on-board unit 110 to the vehicle data collection server 130, in the vehicle data collection server 130, the on-board unit 110 from which the position data is transmitted and the on-board unit 110 from which the accounting data is transmitted cannot be associated with each other. In other words, the vehicle data collection server 130 cannot identify the owner of the on-board unit 110 from which the position data is transmitted.

Figure 13:
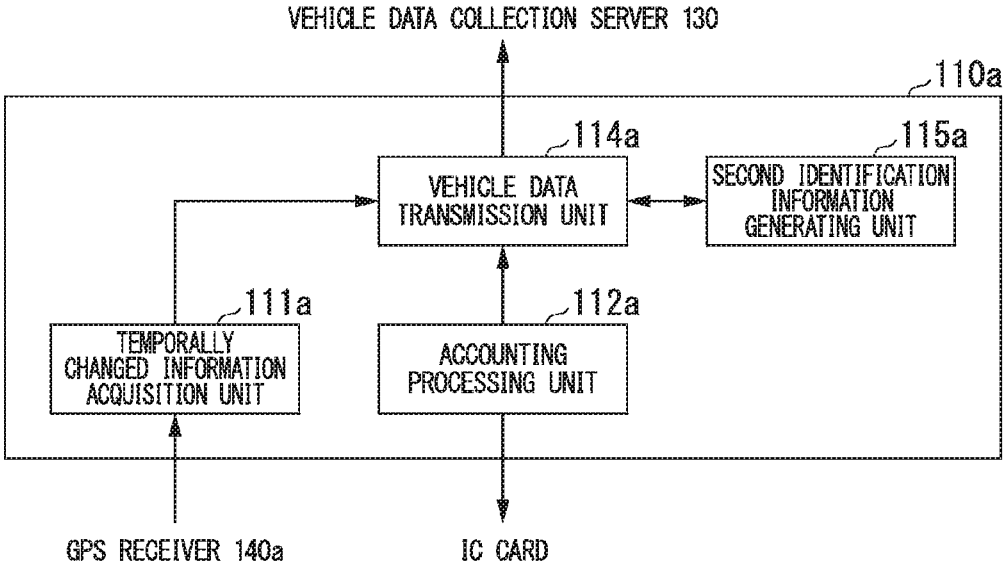
FIG. 13 is a view showing an example of a block configuration of an on-board unit 110a according to a third embodiment.

FIG. 13 shows an example of a block configuration of the on-board unit 110a according to the third embodiment. The on-board unit 110 according to the third embodiment has the temporally changed information acquisition unit 111, the accounting processing unit 112, a second identification information generating unit 115, and the vehicle data transmission unit 114.

Furthermore, among the components of the on-board unit 110 according to the third embodiment, the components having the same name to which the same reference numerals are attached as the components of the on-board unit 110 according to the first embodiment represent the same function and operation as the components of the on-board unit 110 according to the first embodiment. In the following description, functions and operations of the components different from the components of the on-board unit 110 according to the first embodiment will be described in detail.

The second identification information generating unit 115 generates the random ID.

Figure 14:
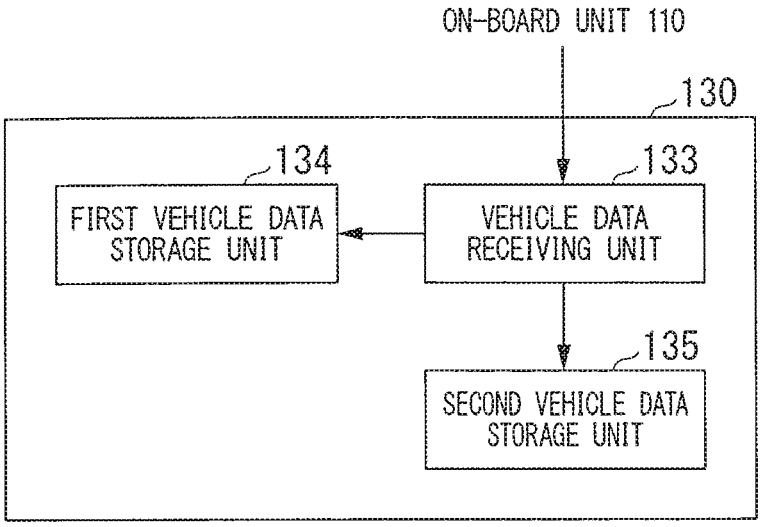
FIG. 14 is a view showing an example of a block configuration of a vehicle data collection server 130 according to the third embodiment.

FIG. 14 shows an example of a block configuration of the vehicle data collection server 130 according to the third embodiment. The vehicle data collection server 130 according to the third embodiment has the vehicle data receiving unit 133, the first vehicle data storage unit 134, and the second vehicle data storage unit 135.

Furthermore, among the components of the vehicle data collection server 130 according to the third embodiment, the components having the same name to which the same reference numerals are attached as the components of the vehicle data collection server 130 according to the first embodiment represent the same functions and operations as the components of the vehicle data collection server 130 according to the first embodiment. In the following description, functions and operations of the components different from the components of the vehicle data collection server 130 according to the first embodiment will be described.

Figure 15:
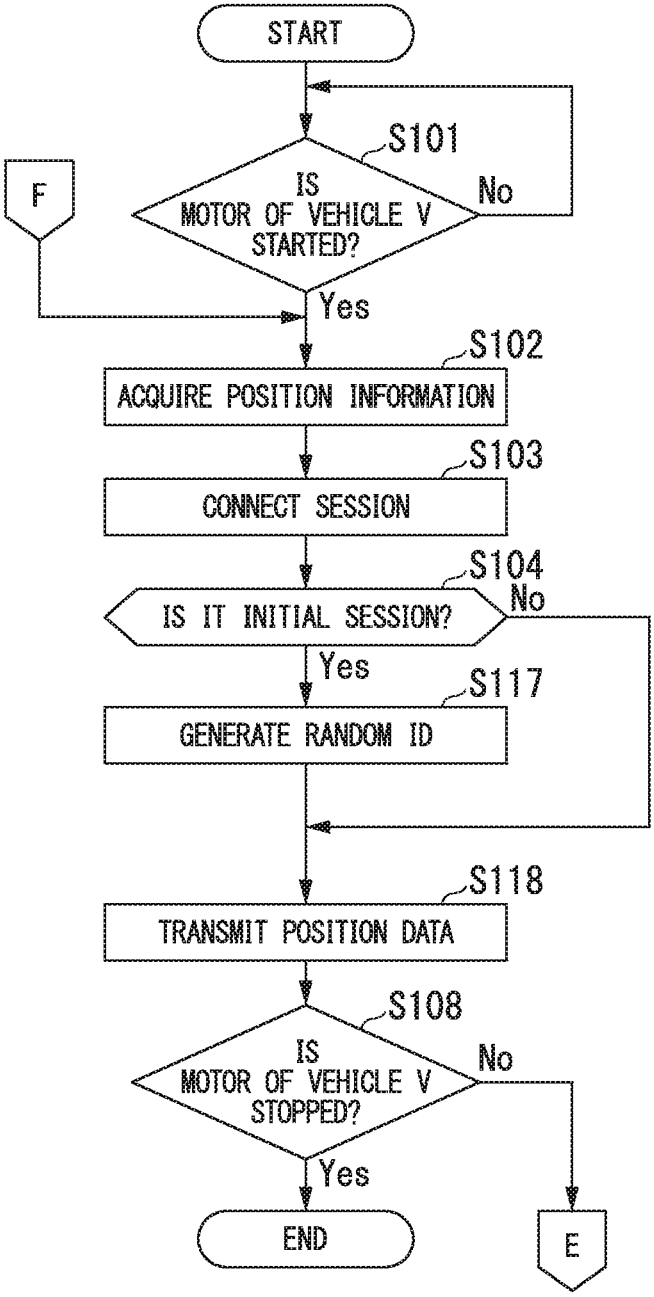
FIG. 15 is a view showing an example of an operation flow of the on-board unit 110 according to the third embodiment.
Figure 16:
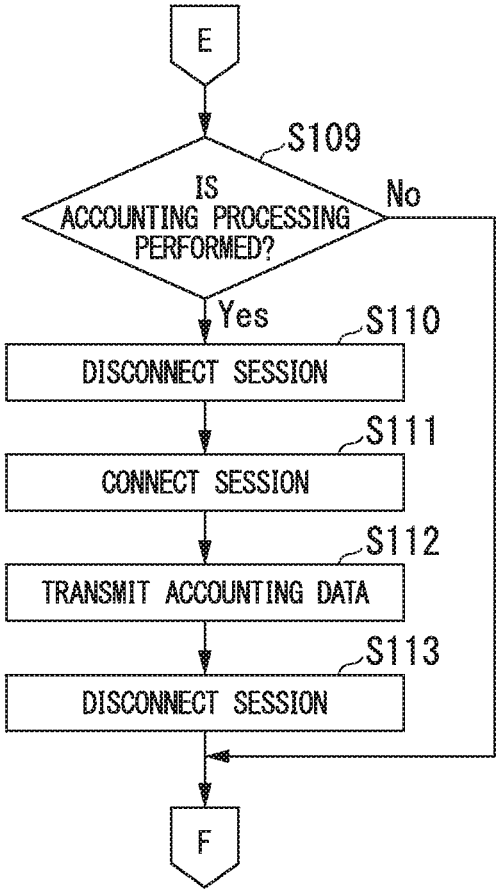
FIG. 16 is a view showing an example of the operation flow of the on-board unit 110 according to the third embodiment.

FIGS. 15 and 16 show an operation flow of the on-board unit 110 according to the third embodiment. In the description of the operation flow, different points from the operation of the on-board unit 110 according to the first embodiment will be described in detail. Furthermore, in the description of the operation flow, FIGS. 1 to 14 are referenced together. In addition, in the processing steps of the operation flow of the on-board unit 110 according to the third embodiment, the same processing step to which the same reference numeral is attached as the processing step of the operation flow of the on-board unit 110 according to the first embodiment represents the same processing as the processing of the operation flow of the on-board unit 110 according to the first embodiment.

After the motor of the vehicle V is started, when the session is initially connected to the vehicle data collection server 130 (S104: Yes), the vehicle data transmission unit 114 of the on-board unit 110 according to the third embodiment sends the data indicating that the initial session is connected to the second identification information generating unit 115.

When the data sent from the vehicle data transmission unit 114 is received, the second identification information generating unit 115 of the on-board unit 110 generates the random ID (S117). Then, the second identification information generating unit 115 sends the ID data indicating the generated random ID to the vehicle data transmission unit 114.

When the ID data sent from the second identification information generating unit 115 is received, the vehicle data transmission unit 114 of the on-board unit 110 transmits the position data including the random ID indicated by the ID data and the position information indicated by the data received from the temporally changed information acquisition unit 111 to the vehicle data collection server 130 (S118).

In this way, in the third embodiment, since the on-board unit 110 is configured to generate the random ID, a processing load in the vehicle data collection server 130 can be distributed.

Figure 17:
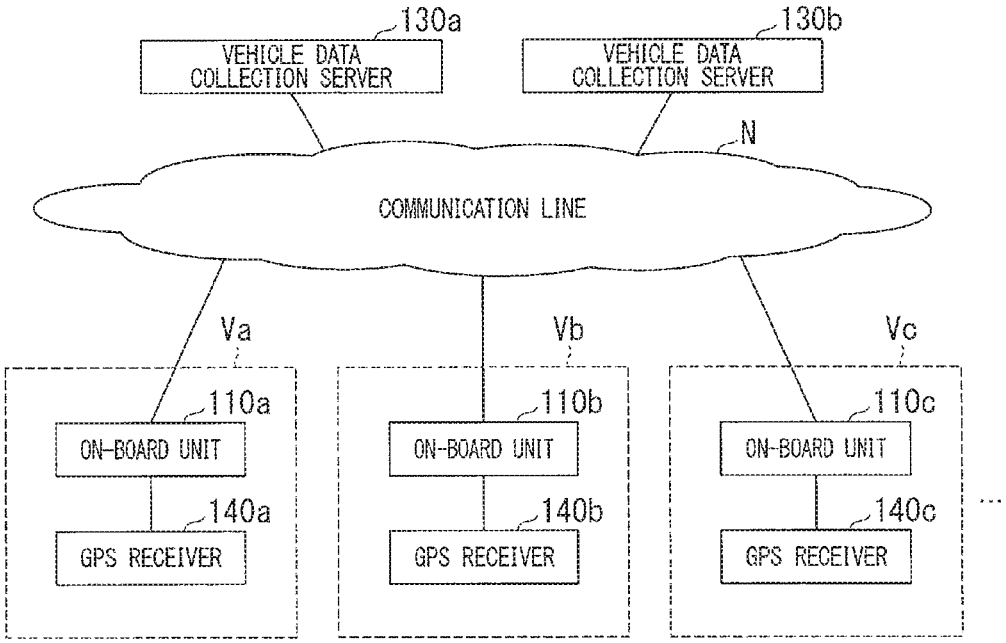
FIG. 17 is a view showing an example of a usage environment of a vehicle data collection system of a fourth embodiment.

FIG. 17 shows an example of a usage environment of a vehicle data collection system according to a fourth embodiment. In the description of the vehicle data collection system according to the fourth embodiment, different points from the vehicle data collection system according to the first embodiment will be described in detail.

The vehicle data collection system according to the fourth embodiment includes the plurality of on-board units 110, a plurality of vehicle data collection servers 130a and 130b (hereinafter, generally referred to as the vehicle data collection server 130), and the plurality of GPS receivers 140.

Furthermore, among the components of the vehicle data collection system according to the fourth embodiment, the components having the same name to which the same reference numerals are attached as the components of the vehicle data collection system according to the first embodiment represent the same functions and operations as the components of the vehicle data collection system according to the first embodiment.

The on-board unit 110 is a device configured to transmit the data related to the vehicle to the vehicle data collection server 130. More specifically, the on-board units 110 are installed in each of the vehicles V,. Then, the on-board unit 110 is electrically connected to the GPS receiver 140 installed in the vehicle V. In addition, the on-board unit 110 is connected for communication with the vehicle data collection server 130 via the communication line N. Then, whenever the input of the data output from the GPS receiver 140 is received, the on-board unit 110 transmits the position data including the position information such as latitude, longitude, and so on, indicated by the data output from the GPS receiver 140 to a vehicle data collection server 130b. In addition, an IC card on which contract information or the like is recorded is inserted into a card slot of the on-board unit 110. Then, when the vehicle V uses the toll road, the on-board unit 110 records the accounting information such as a toll fee of the toll road or the like on the IC card, and transmits the accounting data including the accounting information such as the toll fee or the like to the vehicle data collection server 130a.

The vehicle data collection server 130 is a computer configured to collect data related to the plurality of vehicles V. More specifically, the vehicle data collection server 130 is connected for communication with the on-board unit 110 via the communication line N. Then, the vehicle data collection server 130a receives and manages the accounting data transmitted from the on-board unit 110. Meanwhile, the vehicle data collection server 130b receives and manages the position data transmitted from the on-board unit 110.

Figure 18:
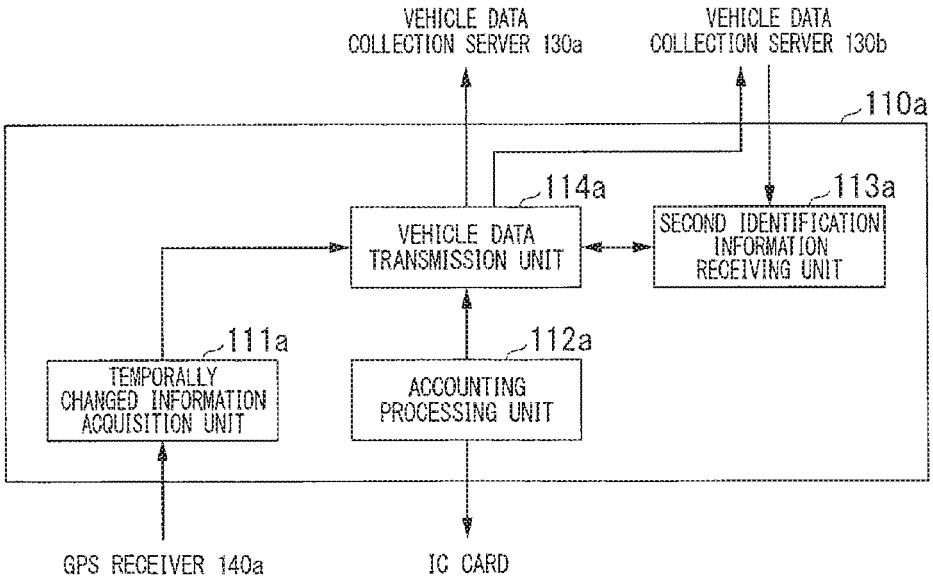
FIG. 18 is a view showing an example of a block configuration of the on-board unit 110a according to the fourth embodiment.

FIG. 18 shows an example of a block configuration of the on-board unit 110a according to a fourth embodiment. The on-board unit 110 according to the fourth embodiment has the temporally changed information acquisition unit 111, the accounting processing unit 112, the second identification information receiving unit 113, and the vehicle data transmission unit 114.

Furthermore, among the components of the on-board unit 110 according to the fourth embodiment, the components having the same name to which the same reference numerals are attached as the components of the on-board unit 110 according to the first embodiment represent the same functions and operations as the components of the on-board unit 110 according to the first embodiment. In the following description, functions and operations of the components different from the components of the on-board unit 110 according to the first embodiment will be described in detail.

The second identification information receiving unit 113 receives the random ID transmitted from the vehicle data collection server 130b.

The vehicle data transmission unit 114 transmits the accounting data to the vehicle data collection server 130a. In addition, the vehicle data transmission unit 114 transmits the position data to the vehicle data collection server 130b.

Figure 19:
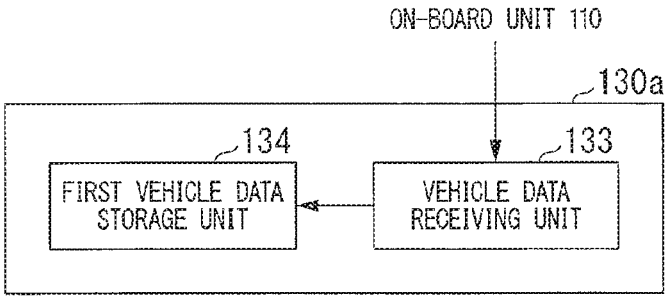
FIG. 19 is a view showing an example of a block configuration of a vehicle data collection server 130a according to the fourth embodiment.

FIG. 19 shows an example of a block configuration of the vehicle data collection server 130a according to the fourth embodiment. The vehicle data collection server 130a according to the fourth embodiment has the vehicle data receiving unit 133, and the first vehicle data storage unit 134.

Furthermore, among the components of the vehicle data collection server 130a according to the fourth embodiment, the components having the same name to which the same reference numerals are attached as the components of the vehicle data collection server 130 according to the first embodiment represent the same functions and operations as the vehicle data collection server 130 according to the first embodiment. In the following description, functions and operations of the components different from the components of the vehicle data collection server 130 according to the first embodiment will be described in detail.

The vehicle data receiving unit 133 receives the accounting data transmitted from the on-board unit 110.

Figure 20:
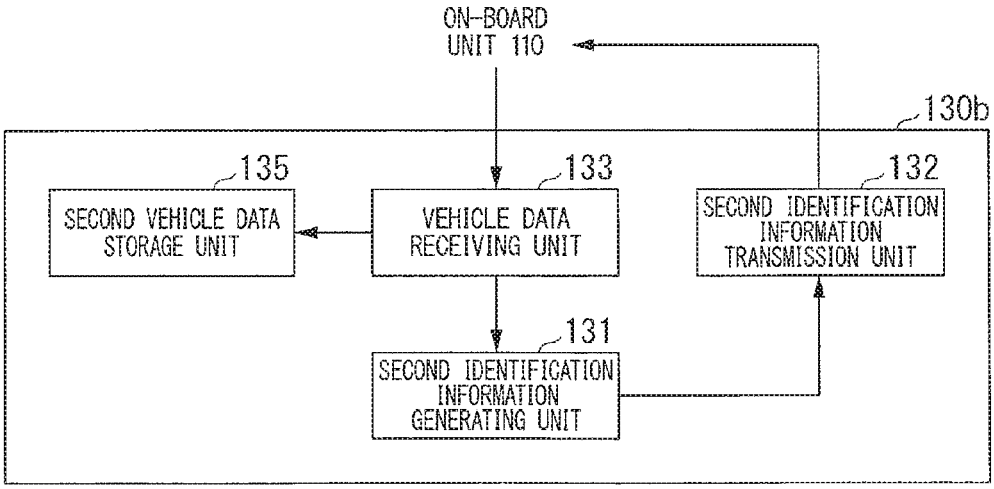
FIG. 20 is a view showing an example of a block configuration of a vehicle data collection server 130b according to the fourth embodiment.

FIG. 20 shows an example of a block configuration of the vehicle data collection server 130b according to the fourth embodiment. The vehicle data collection server 130b according to the fourth embodiment has the second identification information generating unit 131, the second identification information transmission unit 132, the vehicle data receiving unit 133, and the second vehicle data storage unit 135.

Furthermore, among the components of the vehicle data collection server 130b according to the fourth embodiment, the components having the same name to which the same reference numerals are attached as the components of the vehicle data collection server 130 according to the first embodiment represent the same functions and operations as the vehicle data collection server 130 according to the first embodiment. In the following description, functions and operations of the components different from the components of the vehicle data collection server 130 according to the first embodiment will be described in detail.

The vehicle data receiving unit 133 receives the position data transmitted from the on-board unit 110.

Figure 21:
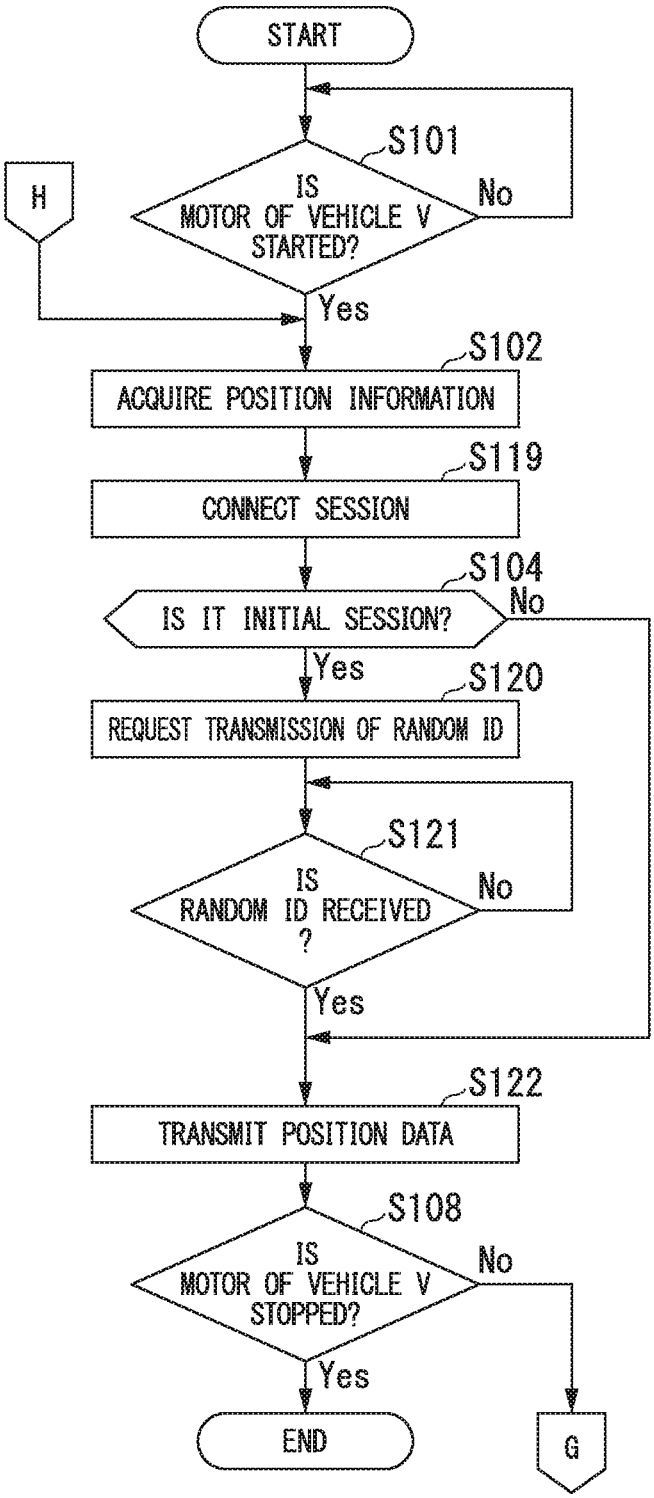
FIG. 21 is a view showing an example of an operation flow of the on-board unit 110 according to the fourth embodiment.
Figure 22:
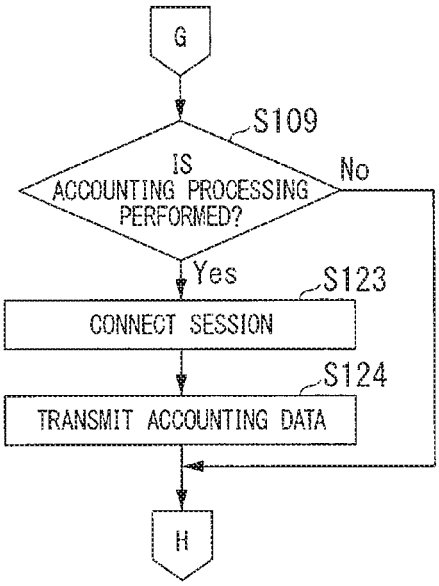
FIG. 22 is a view showing an example of the operation flow of the on-board unit 110 according to the fourth embodiment.

FIGS. 21 and 22 show an example of art operation flow of the on-board unit 110 according to the fourth embodiment. In addition, in the fourth embodiment, FIG. 10 shows an example of an operation flow of the vehicle data collection server 130a. In addition, in the fourth embodiment, FIGS. 8 and 9 show an example of an operation flow of the vehicle data collection server 130b. In the description of these operation flows, different points from the operations of the on-board unit 110 and the vehicle data collection server 130 according to the first embodiment will be described in detail. Furthermore, in the description of these operation flows, FIGS. 1 to 20 will be referenced together. In addition, in the processing steps of the operation flow of the on-board unit 110 and the vehicle data collection server 130 according to the fourth embodiment, the processing step having the same name to which the same reference numeral is attached as the processing step of the operation flows of the on-board unit 110 and the vehicle data collection server 130 according to the first embodiment represents the same processing as the processing of the on-board unit 110 and the vehicle data collection server 130 according to the first embodiment.

When the data sent from the temporally changed information acquisition unit 111 is received, the vehicle data transmission unit 114 of the on-board unit 110 connects the session with the vehicle data collection server 130b (S119). Here, after the motor of the vehicle V is started, when the session is initially connected to the vehicle data collection server 130b(S104: Yes), the vehicle data transmission unit 114 requests transmission of the random ID with respect to the vehicle data collection server 130b (S120).

When the transmission request of the random ID from the on-board unit 110 is received (S201: Yes), the vehicle data receiving unit 133 of the vehicle data collection server 130b sends the data that indicates the request to the second identification information generating unit 131.

When the data sent from the vehicle data receiving unit 133 is received, the second identification information generating unit 131 of the vehicle data collection server 130b generates the random ID (S202). Then, the second identification information generating unit 131 sends the ID data indicating the generated random ID to the second identification information transmission unit 132.

When the ID data sent from the second identification information generating unit 131 is received, the second identification information transmission unit 132 of the vehicle data collection server 130b transmits the data to the on-board unit 110 from which the transmission of the random ID is requested (S203).

When the ID data transmitted from the vehicle data collection server 130b is received (S121: Yes), the second identification information receiving unit 113 of the on-board unit 110 sends the ID data to the vehicle data transmission unit 114.

When the ID data sent from the second identification information receiving unit 113 is received, the vehicle data transmission unit 114 of the on-board unit 110 transmits the position data including the random ID indicated by the ID data and the position information indicated by the data received from the temporally changed information acquisition unit 111 to the vehicle data collection server 130b (S122).

When the position data transmitted from the on-board unit 110 is received (S301: Yes), the vehicle data receiving unit 133 of the vehicle data collection server 130bcorrespondingly stores the information included in the data in the second vehicle data storage unit 135 (S302). In this way, the information shown in FIG. 5 is stored in the second vehicle data storage unit 135 of the vehicle data collection server 130b.

Here, when the vehicle V uses the toll road, the accounting processing unit 112 of the on-board unit 110 performs the accounting processing of the toll fee of the toll road (S109: Yes). For example, the accounting processing unit 112 performs the accounting processing when the accounting information is received from the roadside wireless device installed in the tollgate of the toll road. In addition, for example, the accounting processing unit 112 performs the accounting processing when use of the toll road is detected, based on the position information in which the positioning is performed by the GPS receiver 140. In either case, the accounting processing unit 112 records the accounting information such as the toll fee of the toll road or the like on the IC card, and sends the data indicating the accounting information such as the toll fee or the like to the vehicle data transmission unit 114.

When the data sent from the accounting processing unit 112 is received, the vehicle data transmission unit 114 of the on-board unit 110 connects the session with the vehicle data collection server 130a (S123).

Then, the vehicle data transmission unit 114 transmits the accounting data including the accounting information such as toll fee or the like indicated by the data received from the accounting processing unit 112 and the on-board unit ID to the vehicle data collection server 130a (S124).

When the accounting data transmitted from the on-board unit 110 is received, the vehicle data collection server 130a correspondingly stores the information included in the accounting data to the first vehicle data storage unit 134. As a result, the information shown in FIG. 4 is stored in the first vehicle data storage unit 134 of the vehicle data collection server 130a.

Meanwhile, after transmission of the accounting data, the vehicle data transmission unit 114 of the on-board unit 110 performs the processing from step S102 again.

In this way, in the fourth embodiment, since the on-board unit 110 is configured to transmit the accounting data and the position data to the different vehicle data collection servers 130, the on-board unit 110 can be applied to a business model in which an operator who collects accounting information is different from an operator who collects position information.

Figure 23:
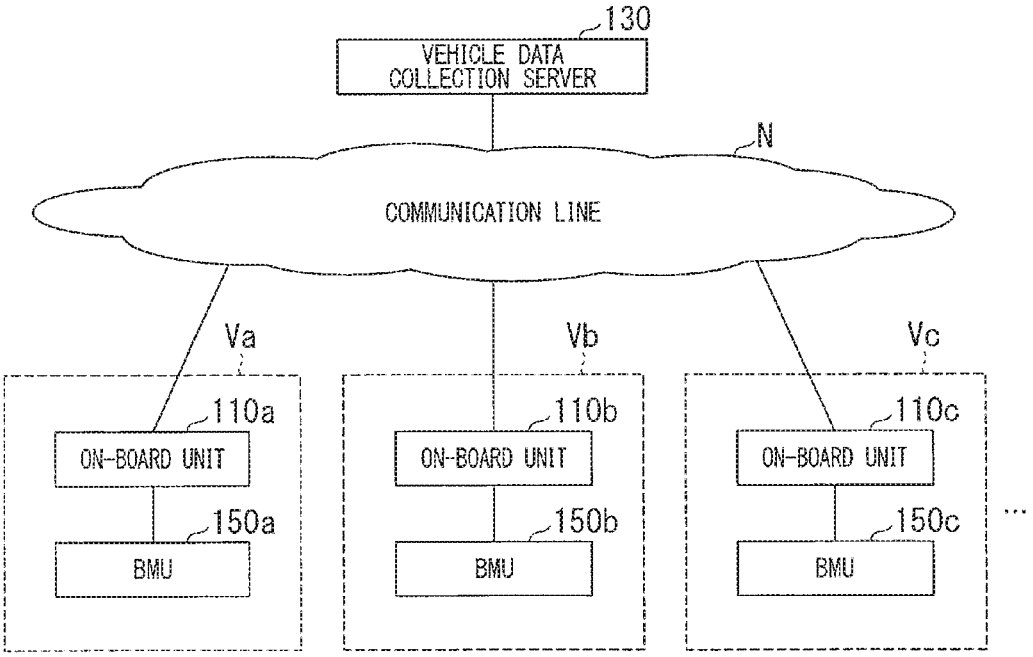
FIG. 23 is a view showing an example of a usage environment of a vehicle data collection system according to a fifth embodiment.

FIG. 23 shows an example of a usage environment of a vehicle data collection system according to a fifth embodiment. In the description of the vehicle data collection system according to the fifth embodiment, different points from the vehicle data collection system according to the first embodiment will be described in detail.

The vehicle data collection system according to the fifth embodiment includes the plurality of on-board units 110, the vehicle data collection server 130, and a plurality of battery management units (BMUs) 150a, 150b, 150c, . . . (hereinafter, generally referred to as a BMU 150).

Furthermore, in the components of the vehicle data collection system according to the fifth embodiment, the components having the same name to which the same reference numerals are attached as the components of the vehicle data collection system according to the first embodiment represent the same functions and operations as the components of the vehicle data collection system according to the first embodiment.

The BMU 150 is a device configured to control a secondary battery of the vehicle V. More specifically, the BMUs 150 are installed in each of the vehicles V. Then, the BMU 150 is connected for communication with the on-board unit 110 installed in the vehicle V via a controller area network (CAN). Also, the BMU 150 observes a state of a secondary battery, and repeatedly calculates a state of charge (SOC). Here, the SOC is information indicating a ratio of an amount of remaining charge with respect to a fully charged capacity of the secondary battery. Then, whenever the SOC is calculated, the BMU 150 transmits the data indicating the battery information such as the SOC or the like to the on-board unit 110. Furthermore, the battery information such as SOC or the like may be "information in which individual related tothe vehicle is not to be identified" and "information related to a time-varied event of the vehicle" of the present invention.

The on-board unit 110 is a device configured to transmit the data related to the vehicle to the vehicle data collection server 130. More specifically, the on-board units 110 are installed in each of the vehicles V. Then, the on-board unit 110 is electrically connected to the BMU 150 installed in the vehicle V. In addition, the on-board unit 110 is connected for communication with the vehicle data collection server 130 via the communication line N. Then, whenever the data transmitted from the BMU 150 is received, the on-board unit 110 transmits the battery data including the battery information such as the SOC or the like indicated by the data to the vehicle data collection server 130. In addition, an IC card on which contract information or the like is recorded is inserted into a card slot of the on-board unit 110. Then, when the vehicle V uses the toll road, the on-board unit 110 records the accounting information such as a toll fee of the toll road or the like on the IC card, and transmits the accounting data including the accounting information such as the toll fee or the like to the vehicle data collection server 130a.

Furthermore, the battery data may be an example of "second vehicle data" of the present invention.

The vehicle data collection server 130 is a computer configured to collect data related to the plurality of vehicles V. More specifically, the vehicle data collection server 130 is connected for communication with the on-board unit 110 via the communication line N. Then, the vehicle data collection server 130 receives and manages the accounting data or the battery data transmitted from the on-board unit 110.

Figures 24, 25:
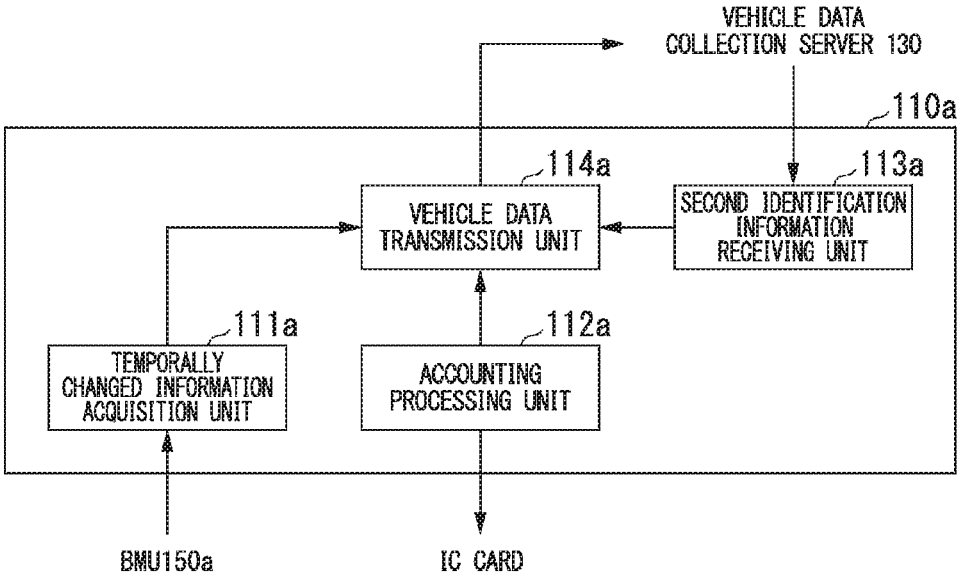
FIG. 24 is a view showing an example of a block configuration of the on-board unit 110a according to the fifth embodiment.
FIG. 25 is a view showing a table indicating an example of information stored in the second vehicle data storage unit 135 according to the fifth embodiment.

FIG. 24 shows an example of a block configuration of the on-board unit 110a according to the fifth embodiment. The on-board unit 110 according to the fifth embodiment has the temporally changed information acquisition unit 111, the accounting processing unit 112, the second identification information receiving unit 113, and the vehicle data transmission unit 114.

Furthermore, among the components of the on-board unit 110 according to the fifth embodiment, the components having the same name to which the same reference numerals are attached as the components of the on-board unit 110 according to the first embodiment represent the same functions and operations as the on-board unit 110 according to the first embodiment. In the following description, functions and operations of the components different from the components of the on-board unit 110 according to the first embodiment will be described in detail.

The temporally changed information acquisition unit 111 acquires battery information.

The vehicle data transmission unit 114 transmits the accounting data and the battery data to the vehicle data collection server 130 in different sessions. More specifically, only when the accounting data is transmitted, the vehicle data transmission unit 114 transmits the data further including the on-board unit ID. In addition, whenever the temporally changed information acquisition unit 111 acquires the battery information, the vehicle data transmission unit 114 transmits the battery data including the battery information acquired by the temporally changed information acquisition unit 111. In addition, when the battery data including the battery information acquired by the temporally changed information acquisition unit 111 is transmitted in the plurality of sessions, the vehicle data transmission unit 114 transmits the battery data further including the random ID which is common to the plurality of sessions. In addition, after the motor of the vehicle V is started, when the battery data is initially transmitted, the vehicle data transmission unit 114 transmits the battery data including a new random ID.

The vehicle data collection server 130 according to the fifth embodiment has the second identification information generating unit 131, the second identification information transmission unit 132, the vehicle data receiving unit 133, the first vehicle data storage unit 134, and the second vehicle data storage unit 135.

Furthermore, among the components of the vehicle data collection server 130 according to the fifth embodiment, the components having the same name to which the same reference numerals are attached as the components of the vehicle data collection server 130 according to the first embodiment represent the same functions and operations as the vehicle data collection server 130 according to the first embodiment. In the following description, functions and operations of the components different from the components of the vehicle data collection server 130 according to the first embodiment will be described in detail.

The vehicle data receiving unit 133 receives the accounting data transmitted from the on-board unit 110. In addition, the vehicle data receiving unit 133 receives the battery data transmitted from the on-board unit 110.

FIG. 25 shows a table of an example of information stored in the second vehicle data storage unit 135 according to the fifth embodiment. Information on the random ID, SOC (%), and time (year/month/day/hour:minute:second) are correspondingly stored in the second vehicle data storage unit 135 according to the fifth embodiment.

The information on the SOC (%) is information indicating a ratio of an amount of remaining charge with respect to a fully charged capacity of the secondary battery of the vehicle V at which the on-board unit 110 to which the random ID is designated is installed. The information on time (year/month/day/hour:minute:second) is information indicating a time when the amount of remaining charge indicated by the information on the SOC (%) is calculated.

Figure 26:
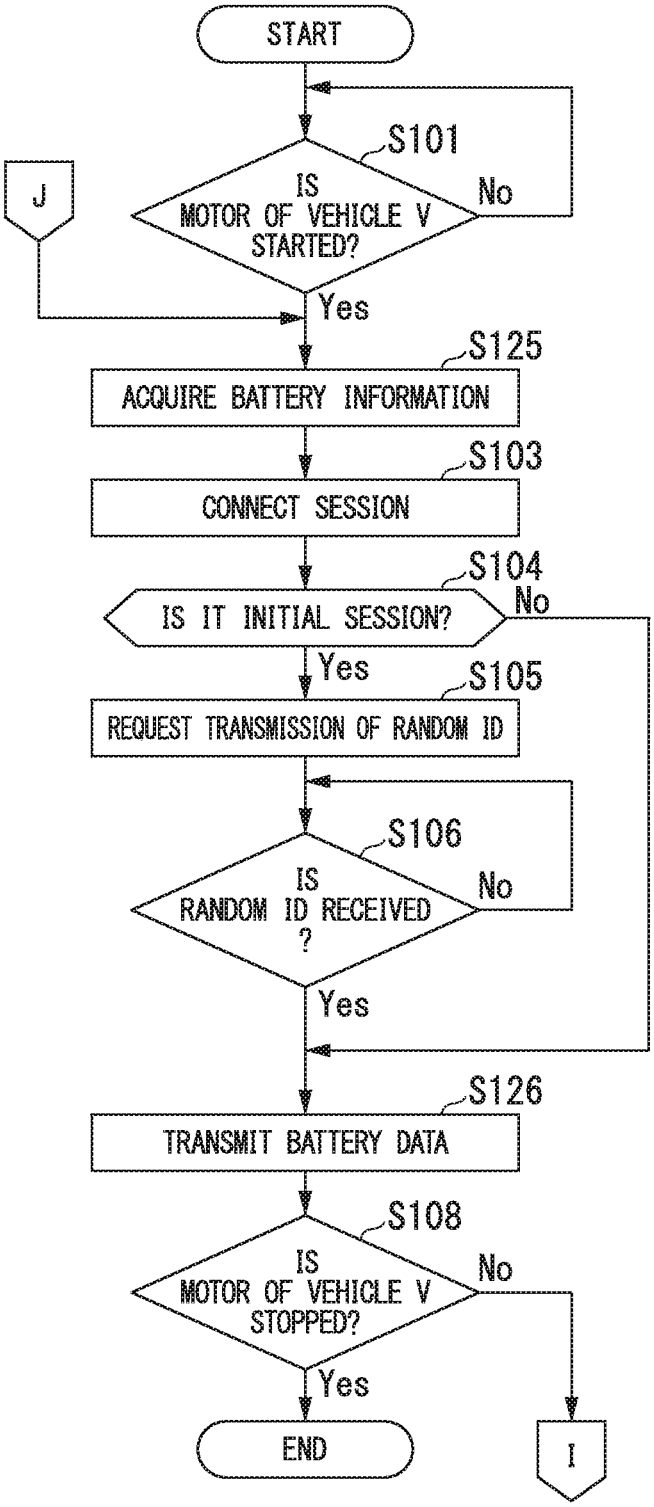
FIG. 26 is a view showing an example of an operation flow of the on-board unit 110 according to the fifth embodiment.
Figure 27:
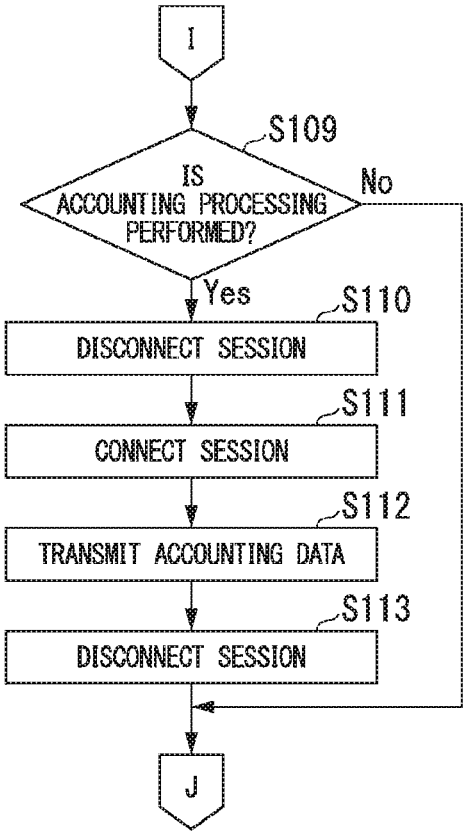
FIG. 27 is a view showing an example of the operation flow of the on-board unit 110 according to the fifth embodiment.
Figure 28:
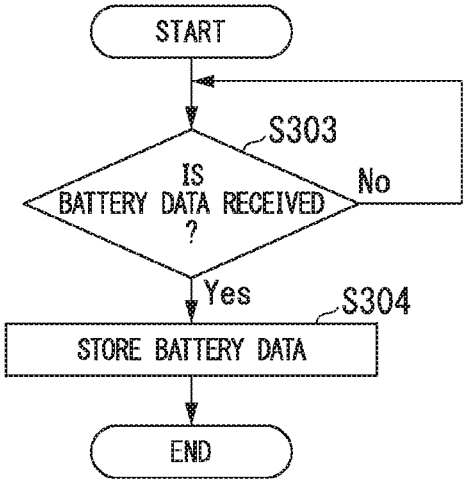
FIG. 28 is a view showing an example of an operation flow of the vehicle data collection server 130 according to the fifth embodiment.

FIGS. 26 and 27 show an example of an operation flow of the on-board unit 110 according to the fifth embodiment. FIG. 28 shows an example of an operation flow of the vehicle data collection server 130 according to the fifth embodiment. In the description of these operation flows, different points from the operations of the on-board unit 110 and the vehicle data collection server 130 according to the first embodiment will be described in detail. Furthermore, in the description of these operation flows, FIGS. 1 to 25 will be referenced together. In addition, in the processing step of the operation flows of the on-board unit 110 and the vehicle data collection server 130 according to the fifth embodiment, the processing step having the same name to which the same reference numeral is attached as the processing step of the operation flows of the on-board unit 110 and the vehicle data collection server 130 according to the first embodiment represents the same processing as the processing of the on-board unit 110 and the vehicle data collection server 130 according to the first embodiment.

When the motor of the vehicle V is started (S101: Yes), the BMU 150 starts observation of a state of the secondary battery. For example, the BMU 150 repeatedly calculates the SOC. Then, whenever the SOC is calculated, the BMU 150 transmits the data indicating the battery information such as SOC or the like to the on-board unit 110.

When the data output from the BMU 150 is received (S125), the temporally changed information acquisition unit 111 of the on-board unit 110 sends the data to the vehicle data transmission unit 114.

Then, the on-board unit 110 performs processing of steps S103 to S106. Then, when the ID data sent from the second identification information receiving unit 113 is received, the vehicle data transmission unit 114 of the on-board unit 110 transmits the battery data including the random ID indicated by the ID data and the battery information indicated by the data received from the temporally changed information acquisition unit 111 to the vehicle data collection server 130 (S126).

When the battery data transmitted from the on-board unit 110 is received (S303: Yes), the vehicle data receiving unit 133 of the vehicle data collection server 130 correspondingly stores the information included in the data in the second vehicle data storage unit 135 (S304). As a result, the information shown in FIG. 25 is stored in the second vehicle data storage unit 135 of the vehicle data collection server 130.

In this way, in the fifth embodiment, an operator of the vehicle data collection system can recognize the temporally changed SOC of the secondary battery of the vehicle V by referring to the information stored in the second vehicle data storage unit 135 corresponding to the random ID which is common to the plurality of sessions without identifying the owner of the vehicle V.

Figure 29:
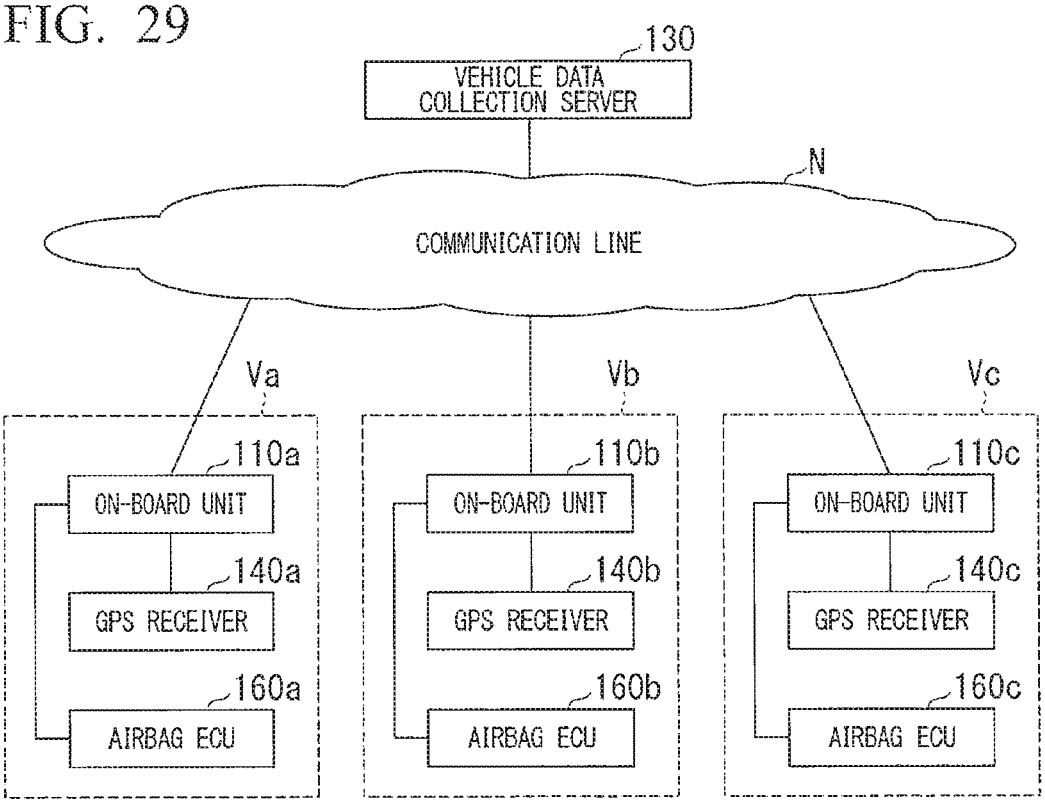
FIG. 29 is a view showing an example of a usage environment of a vehicle data collection system according to a sixth embodiment.

FIG. 29 shows an example of a usage environment of a vehicle data collection system according to a sixth embodiment. In the description of the vehicle data collection system according to the sixth embodiment, different points from the vehicle data collection system according to the first embodiment will be described in detail.

The vehicle data collection system according to the sixth embodiment includes the plurality of on-board units 110, the vehicle data collection server 130, the plurality of GPS receivers 140, and a plurality of airbag electronic control units (ECUs) 160a, 160b, 160c, . . . (hereinafter, generally referred to as an airbag ECU 160).

The GPS receiver 140 is a device configured for positioning a position at which the GPS reviver 140 is located on the earth using GPS satellites. More specifically, the GPS receivers 140 are installed in each of the vehicles V. Then, the GPS receiver 140 is electrically connected to the on-board unit 110 installed in the vehicle V. Then, the GPS receiver 140 detects a transmission delay time from the time information transmitted from the GPS satellites, and repeatedly calculates the latitude and the longitude from the simultaneous equations using the data of three to four satellites. Then, whenever the latitude and the longitude are calculated, the GPS receiver 140 outputs the data indicating the latitude and the longitude to the on-board unit 110. In addition, in response to request of the on-board unit 110, the GPS receiver 140 calculates the latitude and the longitude and outputs the data indicating the latitude and the longitude to the on-board unit 110.

The airbag ECU 160 is a device configured to control an airbag. More specifically, the airbag ECUs 160 are installed in each of the vehicles V. Then, the airbag ECU 160 is electrically connected to an acceleration sensor and an airbag module installed in the vehicle V. In addition, the airbag ECU 160 is connected for communication with the on-board unit 110 through the CAN. Then, when deployment of the airbag is determined based on the output of the acceleration sensor, the airbag ECU 160 outputs the data indicating that the deployment of the airbag to the airbag module, and transmits the data to the on-board unit 110.

The on-board unit 110 is a device configured to transmit the data related to the vehicle to the vehicle data collection server 130. More specifically, the on-board units 110 are installed in each of the vehicles V. Then, the on-board unit 110 is electrically connected to the GPS receiver 140 installed in the vehicle V. In addition, the on-board unit 110 is connected for communication with the airbag ECU installed in the vehicle V via the CAN. In addition, the on-board unit 110 is connected for communication with the vehicle data collection server 130 via the communication line N. Then, whenever the input of the data output from the GPS receiver 140 is received, the on-board unit 110 transmits the position data including the position information such as latitude, longitude, and so on, indicated by the data to the vehicle data collection server 130. In addition, when the data transmitted from the airbag ECU 160 is received, the on-board unit 110 outputs the data indicating a request to output of the information on latitude and longitude to the GPS receiver 140. Then, when the input of the data output from the GPS receiver 140 is received in response to the request, the on-board unit 110 transmits the airbag data including the position information such as latitude, longitude, and so on, indicated by the data and the airbag information that indicates deployment of the airbag to the vehicle data collection server 130. Furthermore, the airbag information may be an example of "information in which the individual related to the vehicle is to be identified" of the present invention. In addition, the airbag data may be an example of "first vehicle data" of the present invention.

The vehicle data collection server 130 is a computer configured to collect the data related to the plurality of vehicles V. More specifically, the vehicle data collection server 130 is connected for communication with the on-board unit 110 via the communication line N. Then, the vehicle data collection server 130 receives and manages the airbag data or the position data transmitted from the on-board unit 110.

Figure 30:
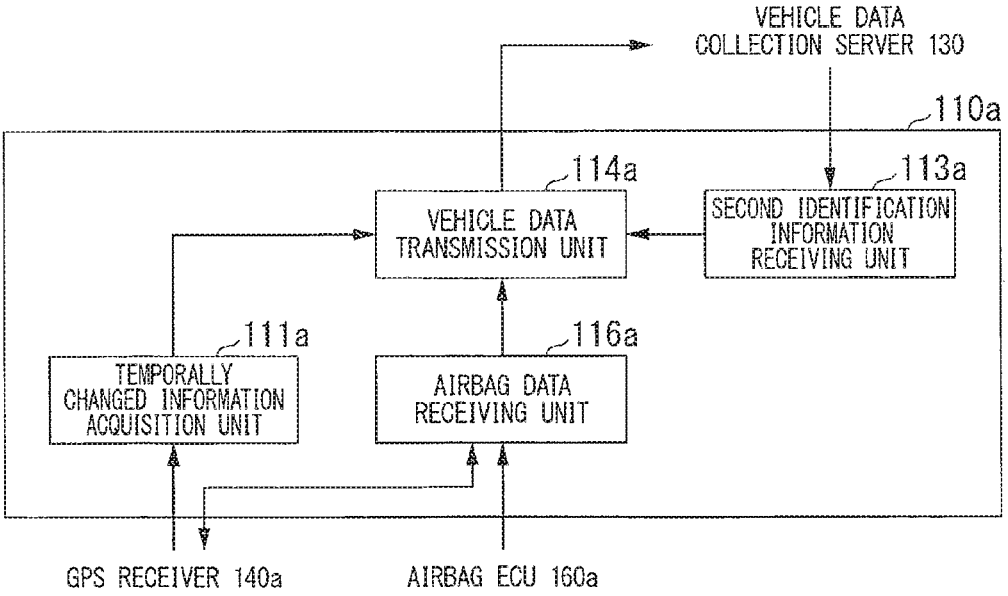
FIG. 30 is a view showing an example of a block configuration of the on-board unit 110a according to the sixth embodiment.

FIG. 30 shows an example of a block configuration of the on-board unit 110aaccording to the sixth embodiment. The on-board unit 110 according to the sixth embodiment has the temporally changed information acquisition unit 111, an airbag data receiving unit 116, the second identification information receiving unit 113, and the vehicle data transmission unit 114.

Furthermore, in the components of the on-board unit 110 according to the sixth embodiment, the components having the same name to which the same reference numerals are attached as the components of the on-board unit 110 according to the first embodiment represent the same functions and operations as the on-board unit 110 according to the first embodiment. In the following description, functions and operations of the components different from the components of the on-board unit 110 according to the first embodiment will be described in detail.

The airbag data receiving unit 116 receives the data indicating that the airbag ECU has determined to deploy the airbag from the airbag ECU.

The vehicle data transmission unit 114 transmits the airbag data and the position data to the vehicle data collection server 130 in different sessions. More specifically, the vehicle data transmission unit 114 transmits the data further including the on-board unit ID only when the airbag data is transmitted. In addition, whenever the temporally changed information acquisition unit 111 acquires the position information, the vehicle data transmission unit 114 transmits the position data including the position information acquired by the temporally changed information acquisition unit 111. In addition, when the position data including the position information acquired by the temporally changed information acquisition unit 111 are transmitted in the plurality of sessions, the vehicle data transmission unit 114 transmits the position data further including the random ID which is common to the plurality of sessions in each of the sessions. In addition, after the motor of the vehicle V is started, when the position data is initially transmitted, the vehicle data transmission unit 114 transmits the position data including a new random ID.

FIG. 31 shows an example of a block configuration of the vehicle data collection server 130 according to the sixth embodiment. The vehicle data collection server 130 according to the sixth embodiment has the second identification information generating unit 131, the second identification information transmission unit 132, the vehicle data receiving unit 133, a display data generating unit 136, the second vehicle data storage unit 135, and an owner data storage unit 137.

Furthermore, among the components of the vehicle data collection server 130 according to the sixth embodiment, the components having the same name to which the same reference numerals are attached as the components of the vehicle data collection server 130 according to the first embodiment represent the same functions and operations as the vehicle data collection server 130 according to the first embodiment. In the following description, functions and operations of the components different from the components of the vehicle data collection server 130 according to the first embodiment will be described in detail.

The vehicle data receiving unit 133 receives the airbag data transmitted from the on-board unit 110. In addition, the vehicle data receiving unit 133 receives the position data transmitted from the on-board unit 110.

The display data generating unit 136 generates the display data configured to display the information related to the vehicle V in which the airbag is deployed.

FIG. 32 shows a table indicating an example of information stored in the owner data storage unit 137 according to the sixth embodiment. Information on the on-board unit ID, the name, the age (years), the gender, the body type, and the color is correspondingly stored in the owner data storage unit 137.

The information on the name is information indicating the name of the owner of the vehicle V at which the on-board unit 110 identified by the on-board unit ID is installed. The information on the age (years) is information indicating the age of the owner of the vehicle V at which the on-board unit 110 identified by the on-board unit ID is installed. The information on the gender is information indicating the age of the owner of the vehicle V at which the on-board unit 110 identified by the on-board unit ID is installed. The information on the body type is information indicating the body type of the vehicle V at which the on-board unit 110 identified by the on-board unit ID is installed. The information on the color is information indicating the color of the vehicle V at which the on-board unit 110 identified by the on-board unit ID is installed.

FIG. 33 shows an example of a display screen D displayed on a display. Information on a current location of the vehicle involved in the accident, the vehicle involved in the accident and the owner are displayed on the display screen D. The information on the vehicle involved in the accident is configured of the information on the body type and the color. The information on the owner is configured of the information on the name, the age, and the gender.

Figure 34:
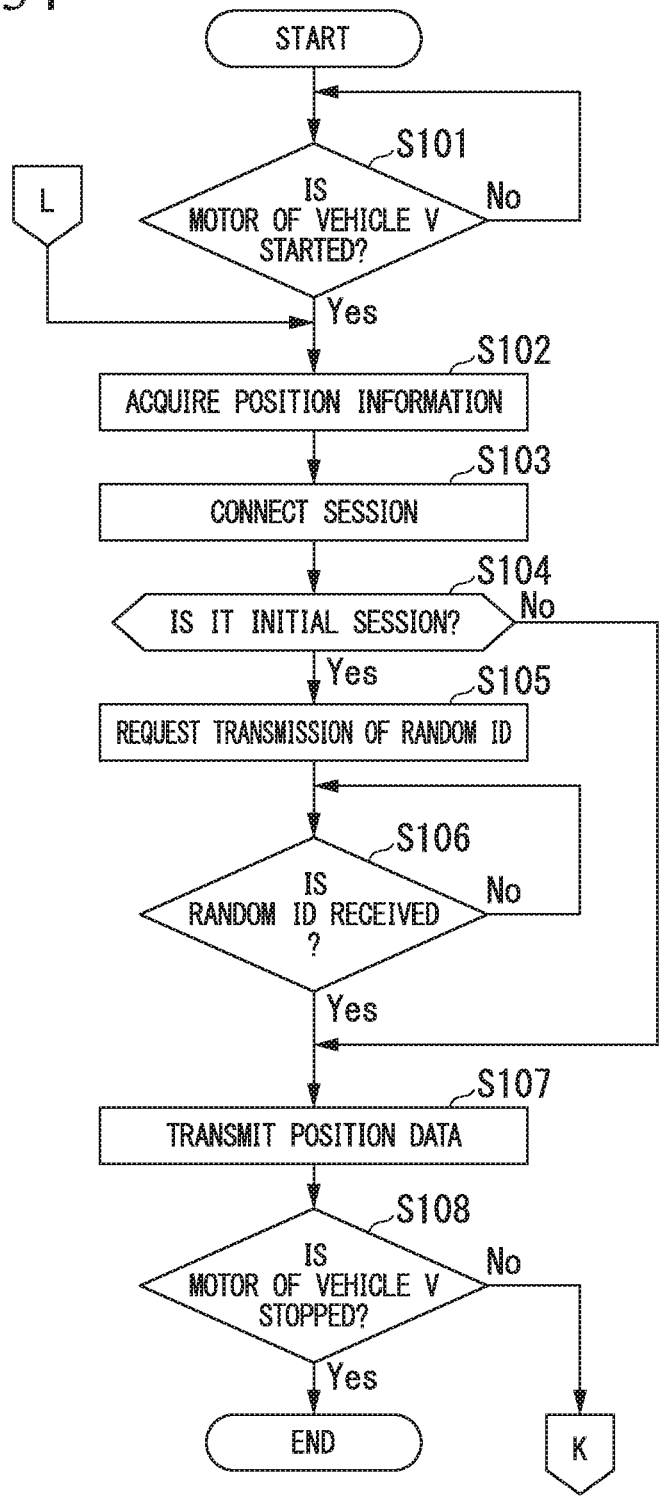
FIG. 34 is a view showing an example of an operation flow of the on-board unit 110 according to the sixth embodiment.
Figure 35:
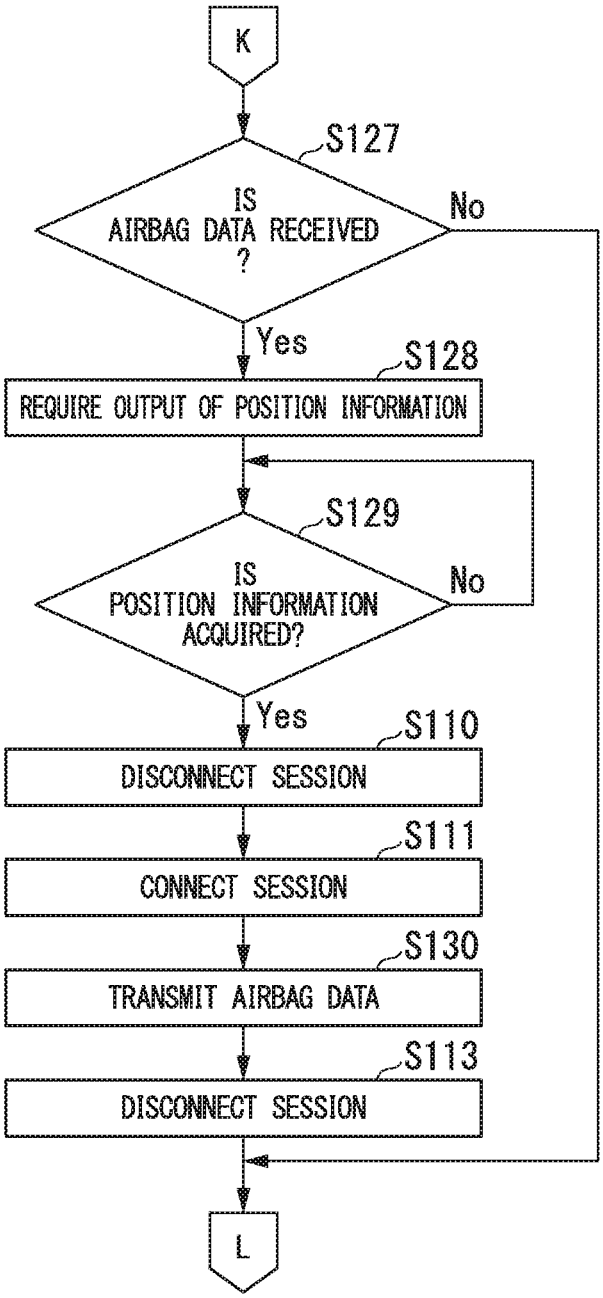
FIG. 35 is a view showing an example of the operation flow of the on-board unit 110 according to the sixth embodiment.
Figure 36:
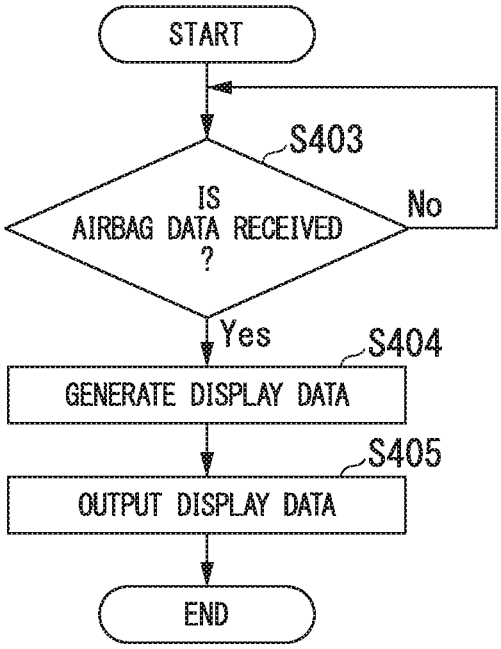
FIG. 36 is a view showing an example of an operation flow of the vehicle data collection server 130 according to the sixth embodiment.

FIGS. 34 and 35 show an example of an operation flow of the on-board unit 110 according to the sixth embodiment. FIG. 36 shows an example of an operation flow of the vehicle data collection server 130 according to the sixth embodiment.

In the description of these operation flows, different points from the operations of the on-board unit 110 and the vehicle data collection server 130 according to the first embodiment will be described in detail. Furthermore, in the description of these operation flows, FIGS. 1 to 31 will be referenced together. In addition, in the processing step of the operation flows of the on-board unit 110 and the vehicle data collection server 130 according to the sixth embodiment, the processing step having the same name to which the same reference numeral is attached as the processing step of the operation flows of the on-board unit 110 and the vehicle data collection server 130 according to the first embodiment represent the same processing as the processing of the on-board unit 110 and the vehicle data collection server 130 according to the first embodiment.

When the vehicle V collides, the airbag ECU 160 determines whether to deploy the airbag based on an output value of the acceleration sensor. Then, when the airbag is determined to have been deployed, the airbag ECU 160 outputs the data indicating that the airbig is determined to have been deployed to the airbag module, and transmits the data to the on-board unit 110. As a result, the airbag is deployed.

When the data transmitted from the airbag ECU 160 is received (S127: Yes), the airbag data receiving unit 116 of the on-board unit 110 outputs the data indicating a request to output the information on the longitude and the latitude to the GPS receiver 140 (S128). Then, when the input of the data output from the GPS receiver 140 in response to the request is received (S129: Yes), the airbag data receiving unit 116 sends the airbag data including the position information such as the latitude, longitude, and so on, indicated by the data, the on-board unit ID, and the airbag information that indicates the deployment of the airbag to the vehicle data transmission unit 114.

When the airbag data sent from the airbag data receiving unit 116 is received, the vehicle data transmission unit 114 of the on-board unit 110 disconnects the session with the vehicle data collection server 130 (S110), and connects the session again (S111). Then, the vehicle data transmission unit 114 transmits the airbag data received from the airbag data receiving unit 116 to the vehicle data collection server 130 (S130).

When the airbag data transmitted from the on-board unit 110 is received (S403: Yes), the vehicle data receiving unit 133 of the vehicle data collection server 130 sends the airbag data to the display data generating unit 136.

When the airbag data sent from the vehicle data receiving unit 133 is received, the display data generating unit 136 of the vehicle data collection server 130 generates display data for displaying the information related to the vehicle V in which the airbag thereof is deployed on the display based on the information included in the airbag data (S404). For example, the display data generating unit 136 performs map matching processing using the position information included in the airbag data, and identifies the current location of the vehicle V. In addition, for example, the display data generating unit 136 identifies the information on the vehicle V correspondingly stored in the on-board unit ID included in the airbag data and the information on the owner of the vehicle V, in the information stored in the owner data storage unit 137. Then, the display data generating unit 136 generates the display data indicating the display screen D including the information identified in this way. Then, the display data generating unit 136 outputs the generated display data to the display (S405). Then, the display screen D as shown in FIG. 33 is displayed on the display.

As a result, in the sixth embodiment, the operator of the vehicle data collection system can request an ambulance while identifying the position information on the vehicle V that causes an accident, information indicating features of the vehicle V, information related to a person who has high probability as being a passenger of the vehicle V, or the like, by referring to the displayed information on the display.

As described above, the vehicle data collection system is a system configured to collect the data related to the plurality of vehicles V. Then, the vehicle data collection system includes the on-board unit 110 installed in the vehicle V and configured to transmit the data related to the vehicle. In addition, the vehicle data collection system includes the vehicle data collection server 130 configured to collect the data related to the plurality of vehicles V. Then, the on-board unit 110 transmits the first vehicle data, which is the data related to the vehicle, including the information in which the individual related to the vehicle it to be identified, and the second vehicle data including the information in which the individual related to the vehicle is not to be identified, to the vehicle data collection server 130 in different sessions.

As a result, it is possible for the vehicle data collection system to collect the information in which the individual related to the vehicle is to be identified and the information in which the individual related to the vehicle is not to be identified without invasion of the privacy of the user. In addition to the case in which vehicle data communication is performed for the purpose of road pricing only, the vehicle data collection system may be a system advantageous for, in particular, the case in which both of collection of the probe information unrelated to the road pricing, and the road pricing are performed.

In addition, as described above, the on-board unit 110 transmits the data further including the on-board unit ID only when the first vehicle data is transmitted.

As a result, it is possible for the vehicle data collection system to identify the individual such as the owner of the vehicle V or the like at which the on-board unit 110 from which the first vehicle data is transmitted, by referring to the on-board unit ID.

In addition, as described above, the on-board unit 110 acquires the information related to time-varying events of the vehicle. Then, whenever the information related to the time-varying events of the vehicle is acquired, the on-board unit 110 transmits the second vehicle data including the information related to the time-varying events of the vehicle as the information in which the individual related to the vehicle is not to be identified.

As a result, it is possible for the vehicle data collection system to collect the information related to the time-varying events of the vehicle V, such as the position information on the vehicle V, the SOC information on the secondary battery of the vehicle V, or the like, without identifying the individual related to the vehicle V.

In addition, as described above, when the second vehicle data including the information related to the time-varying events of the vehicle is transmitted at the plurality of sessions, the on-board unit 110 transmits the data further including the random ID which is common to the plurality of sessions in each session.

As a result, it is possible for the vehicle data collection system to associate and manage the information related to a series of events when the information related to the time-varying events of the vehicle V even if the session between the on-board unit 110 and the vehicle data collection server 130 is disconnected.

In addition, as described above, after the motor of the vehicle is started, when the second vehicle data is initially transmitted, the on-board unit 110 transmits the data including a new random ID.

As a result, it is possible for the vehicle data collection system to associate and collect the information related to the time-varying events of the vehicle V from start to stop of the motor of the vehicle V.

In addition, as described above, the on-board unit 110 transmits the first vehicle data and the second vehicle data to the different vehicle data collection servers 130.

As a result, it is possible for the vehicle data collection system to apply to a business model in which an operator who collects the information in which the individual related to the vehicle is to be identified is different from an operator who collects the information in which the individual related to the vehicle is not to be identified.

Figure 37:
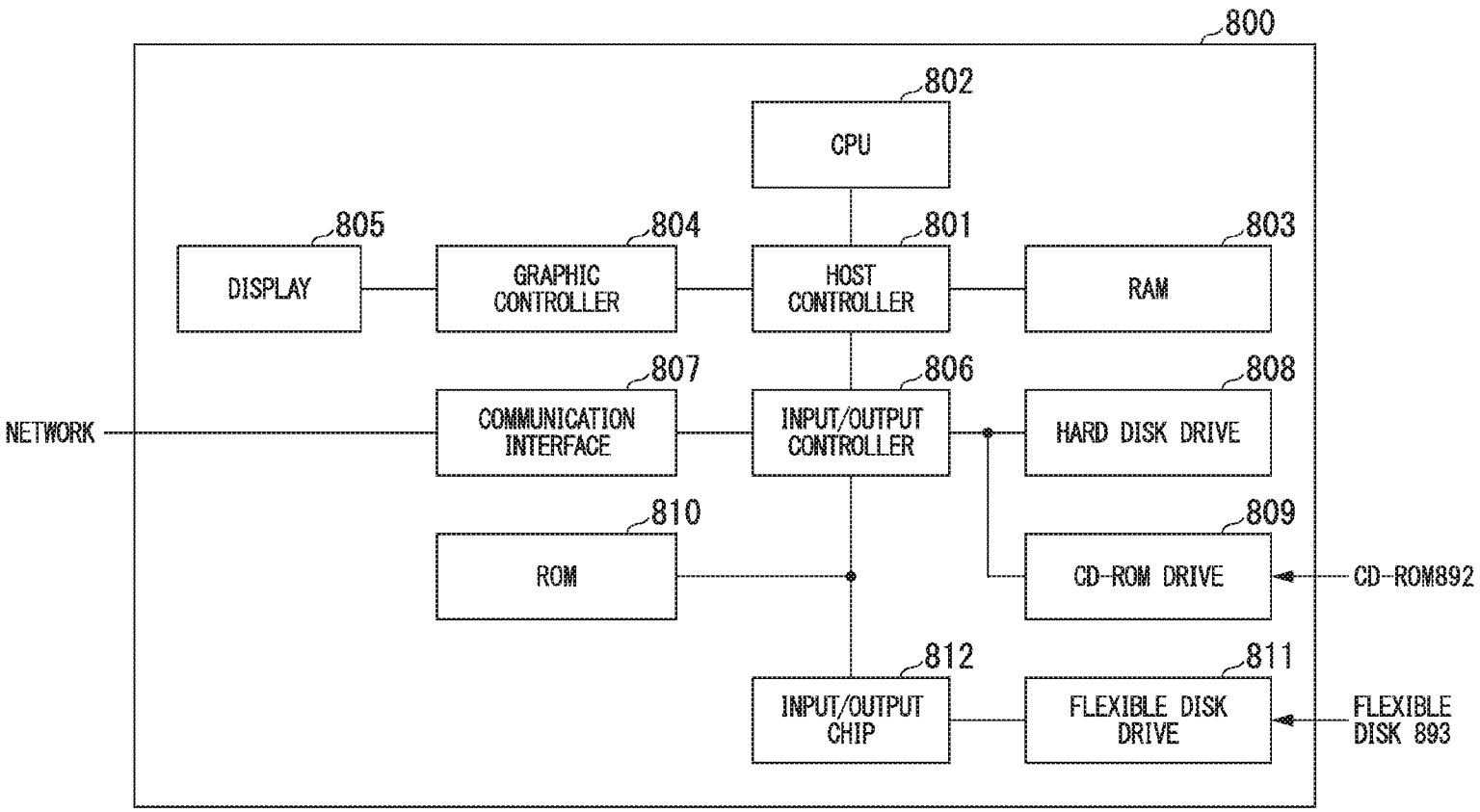
FIG. 37 is a view showing an example of a hardware configuration of a computer 800 constituting the on-board unit 110 according to the embodiment.

FIG. 37 shows an example of a hardware configuration of a computer 800 configuring the on-board unit 110 according to the embodiment. The computer 800 according to the embodiment includes a CPU peripheral unit which has a central processing unit (CPU) 802, a random access memory (RAM) 803, a graphic controller 804, and a display 805 connected to each other by a host controller 801, an input/output unit which has a communication interface 807, a hard disk drive 808 and a compact disk read only memory (CD-ROM) drive 809 connected to each other by an input/output controller 806, and a legacy input/output unit which has a read only memory (ROM) 810, a flexible disk drive 811 and an input/output chip 812 connected to an input/output controller 806.

The host controller 801 connects the RAM 803, the CPU 802 configured to access the RAM 803 at a high transmission rate, and the graphic controller 804. The CPU 802 is operated based on a program stored in the ROM 810 and the RAM 803, and controls the respective parts. The graphic controller 804 acquires image data which is generated on a frame buffer prepared in the RAM 803 by the CPU 802 or the like, and displays the image data on the display 805. Alternatively, the graphic controller 804 may include the frame buffer configured to store the image data generated by the CPU 802 or the like.

The input/output controller 806 connects the host controller 801, the communication interface 807, which is a relatively high speed input/output device, the hard disk drive 808, and the CD-ROM drive 809. The hard disk drive 808 stores the program and data used by the CPU 802 in the computer 800. The CD-ROM drive 809 reads the program or data from a CD-ROM 892, and provides the program or data to the hard disk drive 808 via the RAM 803.

In addition, the ROM 810, the flexible disk drive 811, and a relatively low speed input/output device of the input/output chip 812 are connected to the input/output controller 806. The ROM 810 stores a boot program performed upon starting of the computer 800, a program depending on hardware of the computer 800, and so on. The flexible disk drive 811 reads the program or the data from a flexible disk 893, and provides the program or the data to the hard disk drive 808 via the RAM 803. The input/output chip 812 connects the flexible disk drive 811 to the input/output controller 806, and connects various input/output devices to the input/output controller 806 via, for example, a parallel port, a serial port, a keyboard port, a mouse port, and so on.

The program provided to the hard disk drive 808 via the RAM 803 is stored in the recording medium such as the flexible disk 893, the CD-ROM 892, an integrated circuit (IC) card, or the like, and provided by a user. The program is read from the recording medium, installed in the hard disk drive 808 in the computer 800 via the RAM 803, and executed in the CPU 802.

The program installed in the computer 800 and configured to cause the computer 800 to serve as the on-board unit 110 causes the computer 800 to function as the vehicle data transmission unit 114 configured to transmit the first vehicle data including the information in which the individual related to the vehicle is to be identified and the second vehicle data including, the information in which the individual to the vehicle is not to be identified, which are data related to the vehicle, to the vehicle data collection server 130 in different sessions.

Further, the program may cause the computer 800 to function as the vehicle data transmission unit 114 configured to transmit the data further including the on-board unit ID that can identify the individual related to the vehicle only when the first vehicle data is transmitted.

Further, the program may cause the computer 800 to function as the temporally changed information acquisition unit 111 configured to acquire the information related to the time-varied events of the vehicle, and the vehicle data transmission unit 114 configured to transmit the second vehicle data including the information acquired by the temporally changed information acquisition unit 111 as the information in which the individual related to the vehicle is not to be identified, whenever the temporally changed information acquisition unit 111 acquires the information.

Further, the program may cause the computer 800 to function as the vehicle data transmission unit 114 configured to transmit the data further including the random ID which is common to the plurality of sessions in each session when the second vehicle data including the information acquired by the temporally changed information acquisition unit 111 are transmitted in the plurality of sessions.

Further, the program may cause the computer 800 to function as the vehicle data transmission unit 114 configured to transmit the data including a new random ID after the motor of the vehicle is started, when the second vehicle data is initially transmitted.

Further, the program may cause the computer 800 to function as the vehicle data transmission unit 114 configured to transmit the first vehicle data and the second vehicle data to the different vehicle data collection servers 130.

The information processing described in these programs functions as the temporally changed information acquisition unit 111 and the vehicle data transmission unit 114, which are specific units cooperating with the software and the above-mentioned various hardware resources by being read by the computer 800. Then, as calculation or processing of the information according to a use purpose of the computer 800 of the embodiment are realized by these specific units, a specific on-board unit 110 according to the use purpose is constructed.

As an example, when communication is performed between the computer 800 and an external device or the like, the CPU 802 executes a communication program loaded on the RAM 803, and instructs the communication interface 807 to perform communication processing based on the processing content described in the communication program. The communication interface 807 is controlled by the CPU 802, and reads the transmission data stored in a transmission buffer region or the like installed on a storage device such as the RAM 803, the hard disk drive 808, the flexible disk 893, the CD-ROM 892, or the like, to transmit the transmission data to a network, or writes the data received from the network on a reception buffer region or the like installed on the storage device. In this way, the communication interface 807 may transmit the transmitted/received data between the storage device and the communication interface 807 by a direct memory access type, and alternatively, the CPU 802 may read the data from the storage device of the transmission source or the communication interface 807, and may transmit the transmitted/received data by writing the data to the transmission address of the communication interface 807 or the storage device.

In addition, the CPU 802 reads all or a necessary portion of a file, database, or the like, stored in the external storage device such as the hard disk drive 808, the CD-ROM 892, the flexible disk 893, or the like, using the RAM 803 through direct memory access transmission or the like, and performs various processing on the data on the RAM 803. Then, the CPU 802 writes back the processed data to the external storage device through the direct memory access transmission or the like.

Since the RAM 803 can be seen to temporarily hold the contents of the external storage device in such processing, in the embodiment, the RAM 803, the external storage device, and so on, generally refer a memory, a storage unit, a storage device, or the like. Various types of information such as various types of programs, data, tables, databases, or the like, of the embodiment are stored on such a storage device, and become a subject of the information processing. Furthermore, the CPU 802 can include a part of the RAM 803 in a cache memory, and perform reading and writing on the cache memory. In this constitution, since the cache memory carries a part of the function of the RAM 803, in the embodiment, the cache memory is also included in the RAM 803, the memory, and/or the storage device, unless it is stated otherwise.

In addition, the CPU 802 performs various types of processing, which includes various types of calculations, processing of information, conditional judgments, searches for information, substitutions, and so on, described in the embodiment and designated by an order line of the program, on the data read from the RAM 803, and writes back to the RAM 803. For example, when the conditional judgment is performed, the CPU 802 determines whether various variables shown in the embodiment satisfy conditions that are larger than, smaller than, higher than, lower than, or equal to another variable or constant, and when the conditions are satisfied or not satisfied, they are branched into different order lines or call a subroutine.

In addition, the CPU 802 can search the file in the storage device or the information stored in the database or the like. For example, when a plurality of entries in which attribute values of second attributes correspond to attribute values of first attributes are stored in the storage device, the CPU 802 can obtain the attribute values of the second attributes corresponding to the first attributes that satisfy a predetermined condition by searching for the entry coinciding with the condition designated by the attribute values of the first attributes from the plurality of entries stored in the storage device, and reading the attribute values of the second attributes stored in the entry.

The program or the module as described above may be stored in an external storage medium. The storage medium may use an optical recording medium such as a digital versatile disk (DVD), a compact disk (CD), or the like, a magneto-optical recording medium such as a magneto-optical disk (MO) or the like, a tape medium, a semiconductor memory such as an IC card or the like, in addition to the flexible disk 893 and the CD-ROM 892. In addition, a storage medium such as a hard disk, a RAM, or the like, installed in a server system connected to an exclusive communication network or the Internet may be used as a recording, medium, and the program may be provided to the computer 800 via the network.

As described above, while the embodiments of the present invention have been described, the technical scope of the present invention is not limited to the scope disclosed in the embodiments. It will be apparent to those skilled in the art that various modifications and improvements may be made without departing from the technical scope of the present invention. While the embodiments to which such modifications or improvements are added also fall into the technical scope of the present invention, it will be apparent from the disclosure of the accompanying claims.

It should be noted that an execution sequence of the processing of the operation, procedure, step, stage, and so on, in the system, method, device, program, and recording medium, described in the scope of the claims, specification and drawings may be realized in an arbitrary sequence as long as "earlier than," "previously," or the like, is not especially described and output of the previous processing is not used in the next processing. In the operation flows of the scope of the claims, specification and drawings, for convenience, even when "first," "next," or the like, is used for description, it does not necessarily mean that the processing should be performed in that sequence.

INDUSTRIAL APPLICABILITY

The present invention can be applied to a vehicle data collection system for collecting data related to a vehicle, a vehicle data collection method, a vehicle-mounted device installed in a vehicle and configured to transmit data related to a vehicle, a program configured to cause a computer to function as the vehicle-mounted device, and a recording medium on which the program is recorded.

REFERENCE SIGNS LIST

110 on-board unit
111 temporally changed information acquisition unit
112 accounting processing unit
113 second identification information receiving unit
114 vehicle data transmission unit
115 second identification information generating unit
116 airbag data receiving unit
130 vehicle data collection server
131 second identification information generating unit
132 second identification information transmission unit
133 vehicle data receiving unit
134 first vehicle data storage unit
135 second vehicle data storage unit
136 display data generating unit
137 owner data storage unit
140 GPS receiver
150 BMU
160 airbag ECU
800 computer
801 host controller
802 CPU
803 RAM
804 graphic controller
805 display
806 input/output controller
807 communication interface
808 hard disk drive
809 CD-ROM drive
810 ROM
811 flexible disk drive
812 input/output chip
892 CD-ROM
893 flexible disk
D display screen
N communication line
V vehicle

The invention claimed is:

1. A vehicle data collection system for securely collecting data related to a vehicle, the system comprising:

a vehicle-mounted computing device installed in the vehicle and configured to transmit data related to the vehicle; and a vehicle data collection server configured to collect the data related to the vehicle, wherein the vehicle-mounted computing device comprises:

a temporally changed information acquisition unit configured to acquire information related to a time-varied event of the vehicle; and a vehicle data transmission unit configured to transmit first vehicle data, which includes first identification information that is capable of identifying an individual related to the vehicle and information which is other than the first identification information and in which the individual related to the vehicle is to be identified, and second vehicle data, which includes second identification information that is not capable of identifying the individual related to the vehicle and information which is other than the second identification information and which is acquired by the temporally changed information acquisition unit as information in which the individual related to the vehicle is not to be identified, to the vehicle data collection server in different sessions, the first vehicle data and the second vehicle data are data related to the vehicle, wherein the vehicle data transmission unit is configured to:

connect a first session with the vehicle data collection server and send the second vehicle data whenever the temporally changed information acquisition unit acquires information;

connect a second session with the vehicle data collection server after disconnecting the first session and send the first vehicle data when the vehicle data transmission unit needs to send the first vehicle data while the first session is connected; and connect a third session with the vehicle data collection server after disconnecting the second session and send the second vehicle data whenever the temporally changed information acquisition unit acquires information when the vehicle data transmission unit completes sending the first vehicle data, and wherein the vehicle data transmission unit is configured to send the second vehicle data including the second identification information which is common to the first session and the third session.

2. The vehicle data collection system according to claim 1, wherein, after a motor of the vehicle is started, when the second vehicle data is initially transmitted, the vehicle data transmission unit transmits data including a new second identification information.

3. The vehicle data collection system according to claim 1, wherein the vehicle data transmission unit transmits the first vehicle data and the second vehicle data to different vehicle data collection servers respectively.

4. A vehicle data collection method of securely collecting data related to a vehicle, the vehicle data collection method comprising:

a temporally changed information acquisition step of acquiring information related to a tine-varied event of the vehicle; and a vehicle data transmission step of transmitting first vehicle data, which includes first identification information that is capable of identifying an individual related to the vehicle and information which is other than the first identification information and in which the individual related to the vehicle is to be identified, and second vehicle data, which includes second identification information that is not capable of identifying the individual related to the vehicle and information which is other than the second identification information and which is acquired in the temporally changed information acquisition step as information in which the individual related to the vehicle is not to be identified, from a vehicle-mounted computing device, which is installed in the vehicle and configured to send data related to the vehicle, to a vehicle data collection server configured to collect data related to a plurality of vehicles in different sessions, the first vehicle data and the second vehicle data being data related to vehicle, wherein the vehicle data transmission step includes steps of:

connecting a first session with the vehicle data collection server and sending the second vehicle data whenever information is acquired in the temporally changed information acquisition step;

connecting a second session with the vehicle data collection server after disconnecting the first session and sending the first vehicle data when the first vehicle data need to be transmitted while the first session is connected; and connecting a third session with the vehicle data collection server after disconnecting the second session when the step of sending the first vehicle data is completed and sending the second vehicle data whenever information is acquired in the temporally changed information acquisition step, and wherein the second vehicle data including the second identification information which is common to the first session and the third session is transmitted in the vehicle data transmission step.

5. A vehicle-mounted computing device installed in a vehicle and configured to securely transmit data related to the vehicle, the vehicle-mounted computing device comprising:

a temporally changed information acquisition unit configured to acquire information related to a time-varied event of the vehicle; and a vehicle data transmission unit configured to transmit first vehicle data, which includes first identification information that is capable of identifying an individual related to the vehicle and information which is other than the first identification information and in which the individual related to the vehicle is to be identified, and second vehicle data, which includes second identification information that is not capable of identifying the individual related to the vehicle and information which is other than the second identification information and which is acquired by the temporally changed information acquisition unit as information in which the individual related to the vehicle is not to be identified, to a vehicle data collection server configured to collect data related to a plurality of vehicles in different sessions, the first vehicle data and the second vehicle data being data related to the vehicle, wherein the vehicle data transmission unit is configured to:

connect a first session with the vehicle data collection server and send the second vehicle data whenever the temporally changed information acquisition unit acquires information:

connect a second session with the vehicle data collection server after disconnecting the first session and send the first vehicle data when the vehicle data transmission unit needs to send the first vehicle data while the first session is connected; and connect a third session with the vehicle data collection server after disconnecting the second session and send the second vehicle data whenever the temporally changed information acquisition unit acquires information when the vehicle data transmission unit completes sending the first vehicle data, and wherein the vehicle data transmission unit is configured to send the second vehicle data including the second identification information which is common to the first session and the third session.

[6. A program configure to cause a computer to function as a vehicle-mounted computing device installed in a vehicle and configured to securely transmit data related to the vehicle, the program configured to function as:

a temporally changed information acquisition unit configured to acquire information related to a time-varied event of the vehicle; and a vehicle data transmission unit configured to transmit first vehicle data, which includes first identification information that is capable of identifying an individual related to the vehicle and information which is other than the first identification information and in which the individual related to the vehicle is to be identified, and second vehicle data, which includes second identification information that is not capable of identifying the individual related to the vehicle and information which is other than the second identification information and which is acquired by the temporally changed information acquisition unit as information in which the individual related to the vehicle is not to be identified, to a vehicle data collection server configured to collect data related to a plurality of vehicles in different sessions, the first vehicle data and the second vehicle data being data related to the vehicle, wherein the vehicle data transmission unit is configured to:

connect a first session with the vehicle data collection server and send the second vehicle data whenever the temporally changed information acquisition unit acquires information;

connect a second session with the vehicle data collection server after disconnecting the first session and send the first vehicle data when the vehicle data transmission unit needs to send the first vehicle data while the first session is connected; and connect a third session with the vehicle data collection server after disconnecting the second session and send the second vehicle data whenever the temporally changed information acquisition unit acquires information when the vehicle data transmission unit completes sending the first vehicle data, and wherein the vehicle data transmission unit is configured to send the second vehicle data including the second identification information which is common to the first session and the third session.]

7. A non-transitory computer-readable recording medium on which a program configured to cause a computer to function as a vehicle-mounted computing device installed is a vehicle and configured to securely transmit data related to the vehicle is recorded, the non-transitory computer-readable recording medium on which the program configured to function as:

a temporally changed information acquisition unit configured to acquire information related to a time-varied event of the vehicle; and a vehicle data transmission unit configured to transmit first vehicle data, which includes first identification information that is capable of identifying an individual related to the vehicle and information which is other than the first identification information and in which the individual related to the vehicle is to be identified, and second vehicle data, which includes second identification information that is not capable of identifying the individual related to the vehicle and information which is other than the second identification information and which is acquired by the temporally changed information acquisition unit as information in which the individual related to the vehicle is not to be identified, to a vehicle data collection server configured to collect data related to a plurality of vehicles in different sessions is recorded, the first vehicle data and the second vehicle data being data related to the vehicle, wherein the vehicle data transmission unit is configured to:

connect a first session with the vehicle data collection server and send the second vehicle data whenever the temporally changed information acquisition unit acquires information;

connect a second session with the vehicle data collection server after disconnecting the first session and send the first vehicle data when the vehicle data transmission unit needs to send the first vehicle data while the first session is connected; and connect a third session with the vehicle data collection server after disconnecting the second session and send the second vehicle data whenever the temporally changed information acquisition unit acquires information when the vehicle data transmission unit completes sending the first vehicle data, and wherein the vehicle data transmission unit is configured to send the second vehicle data including the second identification information which is common to the first session and the third session.

*8. A vehicle data collection system comprising:*

*a vehicle-mounted computing device installed in the vehicle and configured to transmit data related to the vehicle;*

*a battery management unit installed in the vehicle and configured to observe a state of a battery of the vehicle and transmit a battery data, which includes information in which the individual related to the vehicle is not to be identified and which is related to a state of charge (SOC) of the battery of the vehicle, to the vehicle-mounted computing device; and*

*a plurality of vehicle data collection servers each of which is configured to collect the data related to the vehicle,*

*wherein the vehicle-mounted computing device comprises:*

*a vehicle data transmission unit configured to connect a first session with a first vehicle data collection server and transmit identification information which is capable of identifying an individual related to the vehicle; and*

*an information acquisition unit configured to receive the battery data from the battery management unit, and*

*wherein the vehicle data transmission unit is configured to connect a second session with a second vehicle data collection server after the first session and transmit the battery data, the second vehicle data collection server held by a business operator different from a business operator who holds the first vehicle data collection server.*

*9. The vehicle data collection system according to claim 8,*

*wherein the vehicle-mounted computing device further comprises an accounting processing unit configured to transmit an accounting information to the vehicle data transmission unit; and*

*wherein the vehicle data transmission unit is configured to transmit the accounting information with the identification information to the vehicle data collection server.*

*10. The vehicle data collection system according to claim 9,*

*wherein the accounting processing unit is configured to perform an accounting processing with an integrated circuit (IC) card on which contract information is recorded.*

*11. A method for transmitting vehicle data, the method comprising:*

*connecting a first session with a first vehicle data collection server and transmitting identification information which is capable of identifying the individual related to the vehicle from a vehicle-mounted computing device installed in the vehicle to the first vehicle data collection server;*

*receiving battery data including information in which the individual related to the vehicle is not to be identified and which is related to a state of charge (SOC) of a battery of the vehicle from a battery management unit installed in the vehicle; and*

*connecting a second session with a second vehicle data collection server after the first session and transmitting the battery data from the vehicle-mounted computing device to the second vehicle data collection server.*

*12. A vehicle, comprising:*

*a battery;*

*a vehicle-mounted computing device configured to transmit data related to the vehicle; and*

*a battery management unit configured to observe a state of a battery of the vehicle and configured to transmit a battery data, which includes information in which the individual related to the vehicle is not to be identified and which is related to a state of charge (SOC) of the battery of the vehicle, to the vehicle-mounted computing device;*

*wherein the vehicle-mounted computing device comprises:*

*a vehicle data transmission unit configured to connect a first session with a first vehicle data collection server and transmit identification information, which is capable of identifying an individual related to the vehicle, to the first vehicle data collection server; and*

*an information acquisition unit configured to receive the battery data from the battery management unit, and*

*wherein the vehicle data transmission unit is configured to connect a second session with a second vehicle data collection server after the first session and transmit the battery data to the second vehicle data collection server.*

*13. A vehicle data collection server comprising a first vehicle data collection server and a second vehicle data collection server:*

*wherein the first vehicle data collection server is configured to receive identification information, which is capable of identifying an individual related to the vehicle, from a vehicle-mounted computing device when a first session is connected with the vehicle-mounted device, and*

*wherein the second vehicle data collection server is configured to receive battery data including information in which the individual related to the vehicle is not to be identified and which is related to a state of charge (SOC) of a battery of the vehicle from the vehicle-mounted device when a second session is connected with the vehicle-mounted device.*

*14. A vehicle-mounted computing device comprising:*

*a vehicle data transmission unit configured to connect a first session with a first vehicle data collection server and transmit identification information which is capable of identifying an individual related to the vehicle to the first vehicle data collection server; and*

*an information acquisition unit configured to receive battery data including information in which the individual related to the vehicle is not to be identified and which is related to a state of charge (SOC) of a battery of the vehicle from a battery management unit installed in the vehicle,*

*wherein the vehicle data transmission unit is configured to connect a second session with a second vehicle data collection server after the first session and transmit the battery data to the second vehicle data collection server.*

*15. The vehicle according to claim 12,*

*wherein the first vehicle data collection server and the second vehicle data collection server are held by different business operators.*

*16. The vehicle according to claim 15,*

*wherein the vehicle-mounted computing device further comprises an accounting processing unit configured to transmit accounting information to the vehicle data transmission unit; and*

*wherein the vehicle data transmission unit is configured to transmit the accounting information with the identification information to the vehicle data collection server.*

*17. The vehicle according to claim 16,*

*wherein the accounting processing unit is configured to perform an accounting processing with an integrated circuit (IC) card on which contract information is recorded.*

*18. The vehicle data collection server according to claim 13,*

*wherein the first vehicle data collection server is configured to receive accounting information together with the identification information from the vehicle-mounted computing device.*

*19. The vehicle data collection server according to claim 18,*

*wherein the first vehicle data collection server is configured to receive the accounting information in which an accounting process is processed with an integrated circuit (IC) card on which contract information is recorded.*

*20. The vehicle-mounted computing device according to claim 14, further comprising an accounting processing unit configured to transmit accounting information to the vehicle data transmission unit, and*

*wherein the vehicle data transmission unit is configured to transmit the accounting information with the identification information to the vehicle data collection server.*

*21. The vehicle-mounted computing device according to claim 20,*

*wherein the accounting processing unit is configured to perform the accounting processing with an integrated circuit (IC) card on which contract information is recorded.*

* * * * *